US010607303B2

(12) United States Patent
Lian et al.

(10) Patent No.: US 10,607,303 B2
(45) Date of Patent: Mar. 31, 2020

(54) COORDINATION OF THERMOSTATICALLY CONTROLLED LOADS

(71) Applicant: Battelle Memorial Institute, Richland, WA (US)

(72) Inventors: Jianming Lian, Richland, WA (US); Karanjit Kalsi, Richland, WA (US); Sen Li, Columbus, OH (US); Wei Zhang, Columbus, OH (US)

(73) Assignees: Battelle Memorial Institute, Richland, WA (US); Ohio State Innovation Foundation, Columbus, OH (US)

( * ) Notice: Subject to any disclaimer, the term of this patent is extended or adjusted under 35 U.S.C. 154(b) by 1056 days.

(21) Appl. No.: 14/866,404

(22) Filed: Sep. 25, 2015

(65) Prior Publication Data
US 2016/0092978 A1 Mar. 31, 2016

Related U.S. Application Data

(60) Provisional application No. 62/056,212, filed on Sep. 26, 2014, provisional application No. 62/056,221, filed on Sep. 26, 2014.

(51) Int. Cl.
G06Q 50/06 (2012.01)
G06Q 30/08 (2012.01)
(Continued)

(52) U.S. Cl.
CPC .......... G06Q 50/06 (2013.01); G05B 13/041 (2013.01); G06N 7/005 (2013.01); G06Q 30/08 (2013.01);
(Continued)

(58) Field of Classification Search
CPC ...... G06Q 30/08; G06Q 50/06; G05B 13/041; G06N 7/005; H02J 13/0006
(Continued)

(56) References Cited

U.S. PATENT DOCUMENTS 4,010,614 A   3/1977 Arthur
5,572,438 A   11/1996 Ehlers et al.
(Continued)

OTHER PUBLICATIONS

Papavasilou et. al., "Large-Scale Integration of Deferrable Demand and Renwable Energy Sources", IEEE Transactions on Power Systems, vol. 29, No. 1, 489, 499, Jan. 1, 2014 (Year: 2014).*
(Continued)

Primary Examiner — Kevin H Flynn
Assistant Examiner — Emmett K. Walsh
(74) Attorney, Agent, or Firm — Klarquist Sparkman LLP

(57) ABSTRACT

Apparatus and methods for a market-based control framework to coordinate a group of autonomous thermostatically controlled loads (TCL) to achieve system-level objectives with pricing incentives is disclosed. In one example of the disclosed technology, a method of providing power to a load via a power grid by submitting bids to a coordinator includes determining an energy response relating price data for one or more energy prices to quantity data for power to be consumed by the load, sending a bid for power for a finite time period based on the energy response to the coordinator, and receiving a clearing price based on: the bid, on bids received from a plurality of additional loads, and a feeder power constraint. In some examples, the energy response is based at least in part on an equivalent thermal parameter model and a control policy indicating one or more power states for the load.

19 Claims, 17 Drawing Sheets

(51) Int. Cl.
*H02J 3/00* (2006.01)
*G05B 13/04* (2006.01)
*G06N 7/00* (2006.01)
*G06Q 40/04* (2012.01)
*H02J 3/14* (2006.01)
*H02J 13/00* (2006.01)

(52) U.S. Cl.
CPC .............. *G06Q 40/04* (2013.01); *H02J 3/008* (2013.01); *H02J 3/14* (2013.01); *H02J 13/0006* (2013.01); *H02J 2003/146* (2013.01); *Y02B 70/3225* (2013.01); *Y04S 10/58* (2013.01); *Y04S 20/222* (2013.01); *Y04S 20/224* (2013.01); *Y04S 50/10* (2013.01)

(58) Field of Classification Search
USPC ................................................ 705/412, 7.35
See application file for complete search history.

(56) References Cited

U.S. PATENT DOCUMENTS

| | | |
|---|---|---|
| 5,684,710 A | 11/1997 | Ehlers et al. |
| 5,696,695 A | 12/1997 | Ehlers et al. |
| 5,924,486 A | 7/1999 | Ehlers et al. |
| 6,216,956 B1 | 4/2001 | Ehlers et al. |
| 6,343,277 B1 | 1/2002 | Gaus et al. |
| 6,633,823 B2 | 10/2003 | Bartone et al. |
| 6,681,156 B1 | 1/2004 | Weiss |
| 6,895,325 B1 | 5/2005 | Munson, Jr. |
| 6,963,854 B1 | 11/2005 | Boyd et al. |
| 7,043,380 B2 | 5/2006 | Rodenberg et al. |
| 7,085,739 B1 | 8/2006 | Winter et al. |
| 7,130,719 B2 | 10/2006 | Ehlers et al. |
| 7,135,956 B2 | 11/2006 | Bartone et al. |
| 7,141,321 B2 | 11/2006 | McArthur et al. |
| 7,243,044 B2 | 7/2007 | McCalla |
| 7,249,169 B2 | 7/2007 | Blouin et al. |
| 7,343,226 B2 | 3/2008 | Ehlers et al. |
| 7,343,360 B1 | 3/2008 | Ristanovic et al. |
| 7,379,997 B2 | 5/2008 | Ehlers et al. |
| 7,418,428 B2 | 8/2008 | Ehlers et al. |
| 7,516,106 B2 | 4/2009 | Ehlers et al. |
| 7,599,866 B2 | 10/2009 | Yan et al. |
| 7,716,101 B2 | 5/2010 | Sandholm et al. |
| 7,953,519 B2 | 5/2011 | Hamilton, II et al. |
| 7,996,296 B2 | 8/2011 | Lange |
| 8,126,794 B2 | 2/2012 | Lange et al. |
| 8,271,345 B1 | 9/2012 | Milgrom et al. |
| 8,355,827 B2 | 1/2013 | Egnor et al. |
| 8,478,452 B2 | 7/2013 | Pratt et al. |
| 8,504,463 B2 | 8/2013 | Johnson et al. |
| 8,527,389 B2 | 9/2013 | Johnson et al. |
| 8,577,778 B2 | 11/2013 | Lange et al. |
| 8,639,392 B2 | 1/2014 | Chassin |
| 8,694,409 B2 | 4/2014 | Chassin et al. |
| 8,700,225 B2 | 4/2014 | Pratt et al. |
| 8,706,650 B2 | 4/2014 | Ozog |
| 8,788,415 B2 | 7/2014 | Chassin et al. |
| 8,892,264 B2 | 11/2014 | Steve et al. |
| 9,026,473 B2 | 5/2015 | Chassin et al. |
| 9,087,359 B2 | 7/2015 | Chassin |
| 9,094,385 B2 | 7/2015 | Akyol et al. |
| 9,129,337 B2 | 9/2015 | Chassin et al. |
| 9,240,026 B2 | 1/2016 | Chassin et al. |
| 9,245,297 B2 | 1/2016 | Chassin et al. |
| 9,269,108 B2 | 2/2016 | Chassin et al. |
| 9,342,850 B2 | 5/2016 | Chassin et al. |
| 9,425,620 B2 | 8/2016 | Chassin et al. |
| 9,589,297 B2 | 3/2017 | Fuller et al. |
| 9,817,375 B2 | 11/2017 | Li et al. |
| 10,210,568 B2 | 2/2019 | Lian et al. |
| 2001/0032029 A1 | 10/2001 | Kauffman |
| 2002/0038279 A1 | 3/2002 | Samuelson et al. |
| 2002/0091626 A1 | 7/2002 | Johnson et al. |
| 2002/0128747 A1 | 9/2002 | Mima |
| 2002/0132144 A1 | 9/2002 | McArthur et al. |
| 2002/0178047 A1 | 11/2002 | Or et al. |
| 2003/0014379 A1 | 1/2003 | Saias et al. |
| 2003/0023540 A2 | 1/2003 | Johnson et al. |
| 2003/0036820 A1 | 2/2003 | Yellepeddy et al. |
| 2003/0040844 A1 | 2/2003 | Spool et al. |
| 2003/0040845 A1 | 2/2003 | Spool et al. |
| 2003/0041002 A1* | 2/2003 | Hao ....................... G06Q 30/06 705/37 |
| 2003/0041016 A1 | 2/2003 | Spool et al. |
| 2003/0041017 A1 | 2/2003 | Spool et al. |
| 2003/0055774 A1 | 3/2003 | Ginsberg |
| 2003/0078797 A1 | 4/2003 | Kanbara et al. |
| 2003/0093332 A1 | 5/2003 | Spool et al. |
| 2003/0093357 A1 | 5/2003 | Guler et al. |
| 2003/0139939 A1 | 7/2003 | Spool et al. |
| 2003/0144864 A1 | 7/2003 | Mazzarella |
| 2003/0149672 A1 | 8/2003 | Laskoski |
| 2003/0216971 A1 | 11/2003 | Sick et al. |
| 2004/0010478 A1 | 1/2004 | Peljto et al. |
| 2004/0024483 A1 | 2/2004 | Holcombe |
| 2004/0128266 A1 | 7/2004 | Yellepeddy et al. |
| 2004/0133529 A1 | 7/2004 | Munster |
| 2004/0140908 A1 | 7/2004 | Gladwin et al. |
| 2004/0153330 A1 | 8/2004 | Miller et al. |
| 2004/0254688 A1 | 12/2004 | Chassin et al. |
| 2005/0015283 A1 | 1/2005 | Iino et al. |
| 2005/0027636 A1 | 2/2005 | Gilbert et al. |
| 2005/0065867 A1 | 3/2005 | Aisu et al. |
| 2005/0114255 A1 | 5/2005 | Shields et al. |
| 2005/0125243 A1 | 6/2005 | Villalobos |
| 2005/0137959 A1 | 6/2005 | Yan et al. |
| 2005/0197875 A1 | 9/2005 | Kauffman |
| 2005/0228553 A1 | 10/2005 | Tryon |
| 2006/0036357 A1 | 2/2006 | Isono et al. |
| 2006/0241951 A1 | 10/2006 | Cynamom et al. |
| 2006/0259199 A1 | 11/2006 | Gjerde et al. |
| 2006/0293980 A1 | 12/2006 | Corby et al. |
| 2007/0011080 A1 | 1/2007 | Jain et al. |
| 2007/0061248 A1 | 3/2007 | Shavit et al. |
| 2007/0087756 A1 | 4/2007 | Hoffberg |
| 2007/0124026 A1 | 5/2007 | Troxell et al. |
| 2008/0021628 A1 | 1/2008 | Tryon |
| 2008/0027639 A1 | 1/2008 | Tryon |
| 2008/0039980 A1 | 2/2008 | Pollack et al. |
| 2008/0046387 A1 | 2/2008 | Gopal et al. |
| 2008/0051977 A1 | 2/2008 | Tryon |
| 2008/0243664 A1 | 10/2008 | Shavit et al. |
| 2008/0243682 A1 | 10/2008 | Shavit et al. |
| 2008/0243719 A1 | 10/2008 | Shavit et al. |
| 2008/0297113 A1 | 12/2008 | Saeki et al. |
| 2008/0300907 A1 | 12/2008 | Musier et al. |
| 2008/0300935 A1 | 12/2008 | Musier et al. |
| 2008/0306801 A1 | 12/2008 | Musier et al. |
| 2008/0319893 A1 | 12/2008 | Mashinsky et al. |
| 2009/0063228 A1 | 3/2009 | Forbes |
| 2009/0132360 A1 | 5/2009 | Arfin et al. |
| 2009/0177591 A1 | 7/2009 | Thorpe et al. |
| 2009/0195349 A1 | 8/2009 | Frader-Thompson et al. |
| 2009/0228151 A1 | 9/2009 | Wang et al. |
| 2009/0307059 A1 | 12/2009 | Young et al. |
| 2009/0313174 A1 | 12/2009 | Hafner et al. |
| 2010/0010939 A1 | 1/2010 | Arfin et al. |
| 2010/0049371 A1 | 2/2010 | Martin |
| 2010/0057625 A1 | 3/2010 | Boss et al. |
| 2010/0076835 A1 | 3/2010 | Silverman |
| 2010/0106332 A1* | 4/2010 | Chassin ............... G06Q 20/102 700/278 |
| 2010/0106641 A1 | 4/2010 | Chassin et al. |
| 2010/0107173 A1 | 4/2010 | Chassin |
| 2010/0114387 A1 | 5/2010 | Chassin |
| 2010/0121700 A1 | 5/2010 | Wigder et al. |
| 2010/0179862 A1 | 7/2010 | Pratt et al. |
| 2010/0216545 A1 | 8/2010 | Lange et al. |
| 2010/0217550 A1 | 8/2010 | Crabtree et al. |
| 2010/0218108 A1 | 8/2010 | Crabtree et al. |
| 2010/0256999 A1 | 10/2010 | Ghani et al. |
| 2010/0332373 A1 | 12/2010 | Crabtree et al. |

(56) References Cited

U.S. PATENT DOCUMENTS

| | | |
|---|---|---|
| 2011/0015801 A1 | 1/2011 | Mazzarella |
| 2011/0016055 A1 | 1/2011 | Mazzarella |
| 2011/0081955 A1 | 4/2011 | Lange et al. |
| 2011/0301964 A1 | 12/2011 | Conwell |
| 2012/0022995 A1 | 1/2012 | Lange |
| 2012/0083930 A1* | 4/2012 | Ilic .................... G06Q 30/06 700/287 |
| 2012/0278220 A1 | 11/2012 | Chassin et al. |
| 2012/0278221 A1 | 11/2012 | Fuller et al. |
| 2013/0218743 A1 | 8/2013 | Chassin et al. |
| 2013/0218744 A1 | 8/2013 | Chassin et al. |
| 2013/0254090 A1 | 9/2013 | Chassin et al. |
| 2013/0268132 A1 | 10/2013 | Pratt et al. |
| 2013/0325691 A1 | 12/2013 | Chassin et al. |
| 2013/0325692 A1 | 12/2013 | Chassin et al. |
| 2014/0172503 A1 | 6/2014 | Hammerstrom et al. |
| 2014/0188689 A1 | 7/2014 | Kalsi et al. |
| 2014/0201018 A1 | 7/2014 | Chassin |
| 2016/0092986 A1 | 3/2016 | Lian et al. |

OTHER PUBLICATIONS

Philpott et. al., "Optimized Demand-Side Bids in Day-Ahead Electricity Markets", IEEE Transactions on Power Systems, 21, No. 2, 488, 498, (2006) (Year: 2006).*

Philpott et. al., "Optimized Demand-Side Bids in Day-Ahead Electricity Markets", IEEE Transactions on Power Systems, 21, No. 2, 488, 498, (Year: 2006).*

U.S. Appl. No. 12/587,000.
U.S. Appl. No. 12/587,006.
U.S. Appl. No. 12/587,008.
U.S. Appl. No. 12/587,009.
U.S. Appl. No. 12/686,243.
U.S. Appl. No. 13/096,682.
U.S. Appl. No. 13/096,770.
U.S. Appl. No. 13/846,637.
U.S. Appl. No. 13/846,644.
U.S. Appl. No. 13/846,647.
U.S. Appl. No. 13/964,996.
U.S. Appl. No. 13/965,049.
U.S. Appl. No. 14/108,078.
U.S. Appl. No. 14/166,662.
U.S. Appl. No. 14/866,404.
U.S. Appl. No. 14/866,457.

AEP gridSmart demonstration project, Available: http://www.gridsmartohio.com/, Aug. 2013, 1 page.

AEP Ohio power company standard tariff, Available: https://www.aepohio.com/account/bills/rates/AEPOhioRatesTariffsOH.aspx, Issued: Aug. 28, 2015, 187 pages.

Allcott, "Real Time Pricing and Electricity Markets," Harvard University, Feb. 5, 2009, 77 pages.

Basar, Lecture Notes on Noncooperative Game Theory, Jul. 26, 2010, 142 pages.

Bilgin et al., "Smart building real time pricing for offering load-side regulation service reserves," In 52nd IEEE Conference on Decision and Control, pp. 4341-4348, 2013.

Bishop et al., "Pattern recognition and machine learning," vol. 1, Springer, New York, 2006, 703 pages.

Borenstein et al., "Diagnosing Market Power in California's Deregulated Wholesale Electricity Market," University of California Energy Institute, POWER, PWP-064, 54 pp. (Aug. 2000).

Borenstein et al., "Diagnosing Market Power in California's Deregulated Wholesale Electricity Market," University of California Energy Institute, POWER, PWP-064, 52 pp. (Mar. 2000).

Borenstein et al., "Dynamic Pricing, Advanced Metering, and Demand Response in Electricity Markets," Center for the Study of Energy Markets, 2002, 103 pages.

Boyd et al., "Load Reduction, Demand Response, and Energy Efficient Technologies and Strategies," Pacific Northwest National Laboratory PNNL-18111, 44 pp. (Nov. 2008).

Brambley, "Thinking Ahead: Autonomic Buildings," ACEEE Summer Study on the Energy Efficiency in Buildings, vol. 7, pp. 73-86 (2002).

Burke et al., "Robust Control of Residential Demand Response Network with Low Bandwidth Input," In Proceedings of Dynamic Systems and Control Conference, American Society of Mechanical Engineers, pp. 413-415, Oct. 20-22, 2008.

Cai et al., "Economic Dispatch in Microgrids Using Multi-Agent System," In North American Power Grid Symposium (NAPS), Sep. 2012, 5 pages.

Chandley, "How RTOs Set Spot Market Prices (and How It Helps Keep the Lights on)," PJM Interconnection, 23 pp. (Sep. 2007).

Chang et al., "Modeling and Control of Aggregated Air Conditioning Loads Under Realistic Conditions," 2013 IEEE PES Innovative Smart Grid Technologies (ISGT), Feb. 2013, 6 pages.

Chao, "Price-Responsive Demand Management for a Smart Grid World," The Electricity Journal, vol. 23, No. 1, Jan. 2010, pp. 7-20.

Chassin, "The Abstract Machine Model for Transaction-based System Control," Pacific Northwest National Laboratory PNNL-14082, 28 pp. (Nov. 2002).

Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).

Chassin et al., "Gauss-Seidel Accelerated: Implementing Flow Solvers on Field Programmable Gate Arrays," IEEE Power Engineering Society General Meeting, 5 pp. (Jun. 2006).

Chassin et al., "GridLAB-D: An Open-source Power Systems Modeling and Simulation Environment," In IEEE Transmission and Distribution Conference and Exposition, Aug. 2008, 5 pages.

Chassin, "GridLAB-D Technical Support Document: Tape Modules Version 1.0," Pacific Northwest National Laboratory PNNL-17614, 8 pp. (May 2008).

Chassin, "GridLAB-D Technical Support Document: Commercial Modules Version 1.0," Pacific Northwest National Laboratory PNNL-17615, 8 pp. (May 2008).

Chassin, "GridLAB-D Technical Support Document: Network Module Version 1.0," Pacific Northwest National Laboratory PNNL-17616, 10 pp. (May 2008).

Chassin et al., "Modeling Power Systems as Complex Adaptive Systems," Pacific Northwest National Laboratory PNNL-14987, 151 pp. (Dec. 2004).

Chassin et al., "The pacific northwest demand response market demonstration," IEEE, 6 pp. (Jul. 2008).

Chassin et al., "Project 2.6—Enhancement of the Whole-Building Diagnostician," Pacific Northwest National Laboratory PNNL-14383, 17 pp. (Aug. 2003).

Chassin, "Statistical Mechanics: A Possible Model for Market-based Electric Power Control", Proc. of the 37th Hawaii Int'l Conf. on System Sciences, 10 pp. (Jan. 2004).

Chen et al., "The Influence of Topology Changes on Inter-area Oscillation Modes and Mode Shapes," IEEE Power and Energy Society General Meeting, 7 pp. (Jul. 2011).

Chen et al., "Real-time power control of data centers for providing regulation service," in 52nd IEEE Conference on Decision and Control, Dec. 10-13, 2013, pp. 4314-4321.

Chen et al., "Two Market Models for Demand Response in Power Networks," In Proceedings of 2010 First IEEE International Conference on Smart Grid Communications (SmartGridComm), Oct. 4-6, 2010, pp. 397-402.

Clearwater et al., "Thermal Markets for Controlling Building Environments," Energy Engineering, vol. 91, No. 3, pp. 26-56 (1994).

Collins, "Error Analysis in Scanned Holography," Oregon State University, Ph.D. thesis, Jun. 1970, 110 pages.

Conejo et al., "Price-Taker Bidding Strategy Under Price Uncertainty," IEEE Transactions on Power Systems, vol. 17, No. 4, Nov. 2002, pp. 1081-1088.

Cong et al., "FlowMap: An Optimal Technology Mapping Algorithm for Delay Optimization in Lookup-Table Based FPGA Designs," IEEE Transactions on Computer-Aided Design of Integrated Circuits and Systems, vol. 13, No. 1, Jan. 1994, 12 pages.

(56) References Cited

OTHER PUBLICATIONS

De Ladurantaye et al., "Strategic Bidding for Price-Taker Hydroelectricity Producers," IEEE Transactions on Power Systems, vol. 22, No. 4, Nov. 2007.

Denholm et al., "An Evaluation of Utility System Impacts and Benefits of Optimally Dispatched Plug-In Hybrid Electric Vehicles," NREL Technical Report NREL/TP-620-40293, 30 pp. (Oct. 2006).

Denton et al., "Spot Market Mechanism Design and Competitivity Issues in Electric Power," Proc. of the 31st Hawaii International Conference on System Sciences, vol. 3, pp. 48-56 (Jan. 1998).

Diao et al., "Deriving Optimal Operational Rules for Mitigating Inter-area Oscillations," IEEE/PES Power Systems Conference & Exposition, 8 pp. (Mar. 2011).

Dominguez-Garcia et al., "Resilient Networked Control of Distributed Energy Resources," IEEE Journal on Selected Areas in Communications, vol. 30, No. 6, Jul. 2012, pp. 1137-1148.

Driesen et al., "Design for Distributed Energy Resources," IEEE Power & Energy Magazine, vol. 6, No. 3, pp. 30-40, May/Jun. 2008.

Fahrioglu et al., "Designing Incentive Compatible Contracts for Effective Demand Management," IEEE Transactions on Power Systems, vol. 15, No. 4, Nov. 2000, pp. 1255-1260.

Farhangi, "The Path of the Smart Grid," IEEE Power & Energy Magazine, vol. 8, No. 1, pp. 18-28, Jan./Feb. 2010.

Faruqui et al., "The impact of informational feedback on energy consumption—A survey of the experimental evidence," Energy, vol. 35, No. 4, 2010, pp. 1598-1608.

Feigenbaum et al., "Distributed Algorithmic Mechanism Design: Recent Results and Future Directions," In Proceedings of the 6th International Workshop on Discrete Algorithms and Methods for Mobile Computing and Communications, Sep. 2002, 13 pages.

Fernandez et al., "Self Correcting HVAC Controls: Algorithms for Sensors and Dampers in Air-Handling Units," Pacific Northwest Laboratory PNNL-19104, 49 pp. (Dec. 2009).

Francis et al., "Chortle-crf: Fast Technology Mapping for Lookup Table-Based FPGAs," 28th ACM/IEEE Design Automation Conference, Jun. 21, 1991, pp. 227-233.

Fuller et al., "Analysis of Residential Demand Response and Double-Auction Markets," In Power and Energy Society General Meeting, IEEE, Jul. 24-29, 2011, 7 pages.

Fuller et al., "Analysis of Residential Demand Response and Double-Auction Markets," IEEE Power and Energy Society General Meeting, 7 pp. (Jul. 2011).

Fuller et al., "Evaluation of Representative Smart Grid Investment Grant Project Technologies: Demand Response," Pacific Northwest National Laboratory PNNL-20772, 349 pp. (Feb. 2012).

Fuller et al., "Modeling of GE Appliances in GridLAB-D: Peak Demand Reduction," Pacific Northwest National Laboratory PNNL-21358, 157 pp. (Apr. 2012).

Gatterbauer, "Interdependencies of Electricity Market Characteristics and Bidding Strategies of Power Producers," Master's Thesis, Massachusetts Institute of Technology, 33 pp. (May 2002).

Georgilakis, "Market Clearing Price Forecasting in Deregulated Electricity Markets Using Adaptively Trained Neural Networks," Hellenic Conference on Artificial Intelligence, vol. 3955, pp. 56-66 (2006).

Gjerstad et al., "Price Formation in Double Auctions," Games and Economic Behavior, vol. 22, article No. GA970576, pp. 1-29 (1998). (Document marked as Received Nov. 30, 1995).

Green Car Congress, "PG&E and Tesla to Research Smart Recharging Vehicle-to-Grid Technology," downloaded from http://www.greencarcongress.com/2007/09/pge-and-tesla-t.html, 3 pp. (Sep. 12, 2007).

GridLAB-D residential module user's guide, Available: http://sourceforeg.net/apps/mediawiki/gridlab-d, last modified on Oct. 22, 2013, 24 pages.

Guttromson et al., "Residential energy resource models for distribution feeder simulation," IEEE, vol. 1, pp. 108-113 (Jul. 2003).

Hammerstrom et al., "Pacific Northwest GridWise™ Testbed Demonstration Projects," Part I, Olympic Peninsula Project, Pacific Northwest National Laboratory, Oct. 2007, 157 pages.

Hammerstrom et al., "Pacific Northwest GridWise Testbed demonstration Projects: Part II. Grid Friendly Appliance Project," Pacific Northwest National Laboratory PNNL-17079, 123 pp. (Oct. 2007).

Hammerstrom et al., "Standardization of a Hierarchical Transactive Control System," Grid Interop Conf., 7 pp. (Nov. 2009).

Han et al., "Development of an Optimal Vehicle-to-Grid Aggregator for Frequency Regulation," IEEE Transactions on Smart Grid, vol. 1, No. 1, Jun. 2010, pp. 65-72.

Hao et al., "Aggregate Flexibility of Thermostatically Controlled Loads," IEEE Transactions on Power Systems, vol. 30, No. 1, Jan. 2015, pp. 189-198.

Hao et al., "Ancillary Service for the Grid via Control of Commercial Building HVAC Systems," In 2013 American Control Conference, IEEE, Jun. 17-19, 2013, pp. 467-472.

Hatley et al., "Energy Management and Control System: Desired Capabilities and Functionality," Pacific Northwest National Laboratory PNNL-15074, 46 pp. (Apr. 2005).

Hô et al., "Econophysical Dynamics of Market-Based Electric Power Distribution Systems," IEEE, pp. 1-6 (Jan. 2006).

Hsu et al., "Dispatch of Direct Load Control Using Dynamic Programming," IEEE Transactions on Power Systems, vol. 6, No. 3, Aug. 1991, pp. 1056-1061.

Huang et al., "Analytics and Transactive Control Design for the Pacific Northwest Smart Grid Demonstration Project," In 2010 First IEEE International Conference on Smart Grid Communications (SmartGridCom), IEEE, Oct. 4-6, 2010, pp. 449-454.

Huang et al., "MANGO—Modal Analysis for Grid Operation: A Method for Damping Improvement through Operating Point Adjustment," Pacific Northwest National Laboratory PNNL-19890, 92 pp. (Oct. 2010).

Huang et al., "Transforming Power Grid Operations," Scientific Computing, vol. 45, No. 5, pp. 22-27 (Apr. 2007).

Huberman et al., "A Multi-Agent System for Controlling Building Environments," In Proceedings of the First International Conference on Multiagent Systems, Jun. 12-14, 1995, pp. 171-176.

Human Solutions, "Anthroscan—System Solution for Serial Measurements" [undated], 4 pages.

Hurwicz, "The Design of Mechanisms for Resource Allocation," In the American Economic Review, Papers and Proceedings of the Eighty-fifth Annual Meeting of the American Economic Association, vol. 63, No. 2, May 1973, 31 pages.

Kakhbod et al., "Power Allocation and Spectrum Sharing in Wireless Networks: An Implementation Theory Approach," Mechanisms and Games for Dynamic Spectrum Allocation (Chapter 5), Feb. 2014, 42 pages.

Kannberg et al., "GridWise: The Benefits of a Transformed Energy System," Pacific Northwest National Laboratory PNNL-14396, 48 pp. (Sep. 2003).

Kar et al., "Distributed Robust Economic Dispatch in Power Systems: A Concensus + Innovations Approach," In Proc. IEEE Power and Energy Society General Meeting, Jul. 2012, 8 pages.

Katipamula et al., "Evaluation of Residential HVAC Control Strategies for Demand Response Programs," ASHRAE Trans., Symp. on Demand Response Strategies for Building Systems, 12 pp (Jan. 2006).

Katipamula et al., "Transactive Controls: A Market-Based GridWise Controls for Building Systems," Pacific Northwest National Laboratory PNNL-15921, 14 pp. (Jul. 2006).

Kersting, "Radial Distribution Test Feeders," IEEE Transactions on Power Systems, vol. 6, No. 3, pp. 975-985, Aug. 1991.

Kiesling, "Retail Electricity Deregulation: Prospects and Challenges for Dynamic Pricing and Enabling Technologies," The Searle Center Annual Review of Regulation, 44 pp. (May 2007).

Kim et al., "Scheduling Power Consumption With Price Uncertainty," IEEE Transactions on Smart Grid, vol. 2, No. 3, Sep. 2011, pp. 519-527.

Kinter-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pp. (Jul. 2003).

(56) References Cited

OTHER PUBLICATIONS

Kok et al., "Agent-based Electricity Balancing with Distributed Energy Resources, a Multiperspective Case Study," Proc. Hawaii Int'l Conf. on System Sciences, 10 pp. (Jan. 2008).
Kok et al., "Dynamic Pricing by Scalable Energy Management Systems—Field Experiences and Simulation Results using Powermatcher," In IEEE Power and Energy Society General Meeting, Jul. 2012, 8 pages.
Kok et al., "Intelligence in Electricity Networks for Embedding Renewables and Distributed Generation," In Intelligent infrastructures, Springer, 2010, pp. 179-209.
Kok et al., "PowerMatcher: Multiagent Control in the Electricity Infrastructure," AAMAS, 8 pp. (Jul. 2005).
Lasseter et al., "Integration of Distributed Energy Resources. The CERTS MicroGrid Concept," Lawrence Berkeley National Laboratory, Oct. 2013, 32 pages.
Lemay et al., "An Integrated Architecture for Demand Response Communications and Control," Hawaii Int'l Conf. on System Sciences, 10 pp. (Jan. 2008).
Li et al., "Integrated Power Management of Data Centers and Electric Vehicles for Energy and Regulation Market Participation," IEEE Transactions on Smart Grid, vol. 5, No. 5, Sep. 2014, pp. 2283-2294.
Li et al., Market-Based Coordination of Thermostatically Controlled Loads—Part I: Mechanism Design Formulation, IEEE Transactions on Power System, under review, Mar. 15, 2015, 11 pages.
Li et al., Market-Based Coordination of Thermostatically Controlled Loads—Part II: Unknown Parameters and Case Studies, IEEE Transactions on Power System, has been accepted for inclusion in a future issue, 9 pages.
Li et al., "A Market Mechanism Design Approach for Coordination of Thermostatically Controlled Loads With Unknown Parameters (Part I)," IEEE Transactions on Power System, 2014, 8 pages.
Li et al., "A Market Mechanism Design Approach for Coordination of Thermostatically Controlled Loads With Unknown Parameters (Part II)," IEEE Transactions on Power System, 2014, 8 pages.
Li et al., "A Mechanism Design Approach for Coordination of Thermostatically Controlled Loads," Available at http://arxiv.org/abs/1503.02705, last updated Jun. 15, 2015, 16 pages.
Li et al., "Optimal Demand Response Based on Utility Maximization in Power Networks," In Power and Energy Society General Meeting, IEEE, Jul. 24-29, 2011, 8 pages.
Liu et al., "Planning and Control of Electric Vehicles Using Dynamic Energy Capacity Models," in 52nd Annual Conference on Decision and Control (CDC), IEEE, Dec. 10-13, 2013, pp. 379-384.
Ljung, System Identification: Theory for the User, 255 pages (Prentice Hall 1987).
Lu et al., "Control Strategies of Thermostatically Controlled Appliances in a Competitive Electricity Market," IEEE Proc. Power Engineering Society General Meeting, pp. 202-207 (Jun. 2005).
Lu et al., "Design Considerations for Frequency Responsive Grid Friendly Appliances," IEEE PES Trans. and Distribution Conference and Exhibition, 6 pp. (May 2006).
Lu et al., "An Evaluation of the HVAC Load Potential for Providing Load Balance Service," IEEE Transactions on Smart Grid, vol. 3, No. 3, Sep. 2012, pp. 1263-1270.
Lu et al., "Grid Friendly Device Model Development and Simulation," Pacific Northwest National Laboratory PNNL-18998, 52 pp. (Nov. 2009).
Lu et al., "Modeling Uncertainties in Aggregated Thermostatically Controlled Loads Using a State Queueing Model," IEEE Trans. on Power Systems, vol. 20, No. 2, pp. 725-733 (May 2005).
Lu et al., "Reputation-Aware Transaction Mechanisms in Grid Resource Market," IEEE Sixth Int'l Conf. on Grid and Cooperative Computing, 6 pp. (Aug. 2007).
Lu et al., "Simulating Price Responsive Distributed Resources," IEEE, vol. 3, pp. 1538-1543 (Oct. 2004).
Lu et al., "A State-Queueing Model of Thermostatically Controlled Appliances," IEEE Trans. on Power Systems, vol. 19, No. 3, pp. 1666-1673 (Aug. 2004).

Marion et al., "User's Manual for TMY2s: Typical Meteorological Years: Derived from the 1961-1990 National Solar Radiation data Base," National Renewable Energy Laboratory, Jun. 1995, 55 pages.
Mas-Colell et al., "Microeconomic Theory," Oxford University Press, © 1995, 501 pages.
Maskin, "Mechanism Design: How to Implement Social Goals," in Les Prix Nobel 2007, pp. 296-307 (2008).
Mathieu et al., "State Estimation and Control of Electric Loads to Manage Real-Time Energy Imbalance," IEEE Transactions on Power Systems, vol. 28, No. 1, Feb. 2013, pp. 430-440.
Moeslund, et al., "A Survey of Computer Vision-Based Human Motion Capture," Computer Vision and Image Understanding, vol. 81, No. 3, Mar. 2001, pp. 231-268.
Mohsenian-Rad et al., "Optimal Residential Load Control With Price Prediction in Real-Time Electricity Pricing Environments," IEEE Transactions on Smart Grid, vol. 1, No. 2, Sep. 2010, pp. 120-133.
Nanduri et al., "A Methodology for Evaluating Auction Based Pricing Strategies in Deregulated Energy Markets," Working Paper, 12 pp. (2005).
Nanduri, et al., "A Reinforcement Learning Model to Assess Market Power Under Auction-Based Energy Pricing," IEEE Trans. on Power Systems, vol. 22, No. 1, pp. 85-95 (Feb. 2007).
Nguyen et al., "Optimal Bidding Strategy for Microgrids Considering Renewable Energy and Building Thermal Dynamics," IEEE Transactions on Smart Grid, vol. 5, No. 4, Jul. 2014, pp. 1608-1620.
Nicolaisen et al., "Market Power and Efficiency in a Computational Electricity Market With Discriminatory Double-Auction Pricing," ISU Economic Report No. 52, 26 pp. (Aug. 27, 2000; revised Aug. 24, 2001).
Ntakou et al., "Price Discovery in Dynamic Power Markets with Low-Voltage Distribution-Network Participants," In IEEE Transmission and Distribution Conference and Exposition, Apr. 14-17, 2014, 5 pages.
O'Neill et al., "Model-Based Thermal Load Estimation in Buildings," Fourth National Conference of IBPSA-USA, Aug. 2010, 9 pages.
Palensky et al., "Demand Side Management: Demand Response, Intelligent Energy Systems, and Smart Loads," IEEE Transactions on Industrial Informatics, vol. 7, No. 3, Aug. 2011, pp. 381-388.
Pantoja et al., "Dispatch of Distributed Generators under Local-Information Constraints," In 2014 American Control Conference (ACC), Jun. 4-6, 2014, pp. 2682-2687.
Parkes, "Iterative Combinatorial Auctions: Achieving Economic and Computational Efficiency," PhD thesis, University of Pennsylvania, 2000, 115 pages.
Paschalidis et al., "Demand-Side Management for Regulation Service Provisioning Through Internal Pricing," IEEE Transactions on Power System, vol. 27, No. 3, Aug. 2012, pp. 1531-1539.
Pedrasa et al., "Coordinated Scheduling of Residential Distributed Energy Resources to Optimize Smart Home Energy Services," IEEE Transactions on Smart Grid, vol. 1, No. 2, Sep. 2010, pp. 134-143.
PJM wholesale market energy price, available at: http://www.pjm.com/markets-and-operations/energy.aspx, uploaded Sep. 16, 2015, 3 pages.
Plott et al., "Instability of Equilibria in Experimental Markets: Upward-sloping Demands, Externalities, and Fad-like Incentives," Southern Economic Journal, vol. 65 (3), 23 pp. (Jan. 1999).
Pourebrahimi et al., "Market-based Resource Allocation in Grids," IEEE Int'l Conf. on e-Science and Grid Computing, 8 pp. (2006).
Pratt et al., "Potential Impacts of High Penetration of Plug-in Hybrid Vehicles on the U.S. Power Grid," DOE/EERE PHEV Stakeholder Workshop, 14 pp. (Jun. 2007).
Rahimi et al., "Demand Response as a Market Resource Under the Smart Grid Paradigm," IEEE Transactions on Smart Grid, vol. 1, No. 1, Jun. 2010, pp. 82-88.
Rasouli et al., "Electricity Pooling Markets with Strategic Producers Possessing Asymmetric Information I: Elastic Demand," arXiv:1401.4230, Jan. 17, 2014, 8 pages.

(56) References Cited

OTHER PUBLICATIONS

Reiter, "Information Incentive and Performance in the (new) Welfare Economics," reprinted from American Economic Review, vol. 67, No. 1, Feb. 1977, 27 pages.
Sage et al., Estimation Theory with Applications to Communications and Control, 540 pages (1971).
Salehfar et al., "A Production Costing Methodology for Evaluation of Direct Load Control," IEEE Transactions on Power Systems, vol. 6, No. 1, Feb. 1991, pp. 278-284.
Samadi et al., "Advanced Demand Side Management for the Future Smart Grid Using Mechanism Design," IEEE Transactions on Smart Grid, vol. 3, No. 3, Sep. 2012, pp. 1170-1180.
Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).
Schneider et al., "Analysis of Distribution Level Residential Demand Response," IEEE/PES Power System Conference and Exposition, 6 pp. (Mar. 2011).
Schneider et al., "Detailed End Use Load Modeling for Distribution System Analysis," IEEE Power and Energy Society General Meeting, 7 pp. (Jul. 2010).
Schneider et al., "Distribution Power Flow for Smart Grid Technologies," IEEE/PES Power System Conference and Exhibition, 7 pp. (Mar. 2009).
Schneider et al., "Evaluation of Conservation Voltage Reduction (CVR) on a National Level," Pacific Northwest National Laboratory PNNL-19596, 114 pp. (Jul. 2010).
Schneider et al., "Modern Grid Strategy: Enhanced GridLAB-D Capabilities Final Report," Pacific Northwest National Laboratory PNNL-18864, 30 pp. (Sep. 2009).
Schneider et al., "Multi-State Load Models for Distribution System Analysis," IEEE Trans. on Power Systems, vol. 26, No. 4, pp. 2425-2433 (Nov. 2011).
Schneider et al., "A Taxonomy of North American Radial Distribution Feeders," IEEE Power & Energy Society General Meeting, 6 pp. (Jul. 2009).
Schneider et al., "Voltage Control Devices on the IEEE 8500 Node Test Feeder," IEEE PES Transmission & Distribution Conference & Exposition, 6 pp. (Apr. 2010).
Sharma et al., "Local public good provisioning in networks: A Nash implementation mechanism," IEEE Journal on Selected Areas in Communications, vol. 30, No. 11, Dec. 2012, pp. 2105-2116.
Singh et al., "Effects of Distributed Energy Resources on Conservation Voltage Reduction (CVR)," IEEE Power and Energy Society General Meeting, 7 pp. (Jul. 2011).
Sonderegger, "Diagnostic Tests Determining the Thermal Response of a House," Lawrence Berkeley Laboratory, Nov. 1977, 18 pages.
Sonderegger, "Dynamic models of house heating based on equivalent thermal parameters," Ph.D. Thesis, Princeton University, Dec. 1978, 277 pages.
Steinway, Book Review of "Estimation Theory with Applications to Communication and Control," IEEE Transactions on Systems, Man, and Cybernetics, Oct. 1971, p. 405.
Taylor et al., "GridLAB-D Technical Support Document: Residential End-Use Module Version 1.0," Pacific Northwest National Laboratory PNNL-17694, 30 pp. (Jul. 2008).
Vandael et al., "A Scalable Three-Step Approach for Demand Side Management of Plug-in Hybrid Vehicles," IEEE Transactions on Smart Grid, vol. 4, No. 2, Jun. 2013, pp. 720-728.
Vrettos et al., "Demand Response with Moving Horizon Estimation of Individual Thermostatic Load States from Aggregate Power Measurements," In 2014 American Control Conference (ACC), Jun. 4-6, 2014, pp. 4846-4853.
Weather History for KOSU, Aug. 2009, 5 pages.
Weather Underground: Weather History for Ohio State University, OH, downloaded from http://www.wunderground.com, 4 pages.
Wellman, "A Market-Oriented Programming Environment and its Application to Distributed Multicommodity Flow Problems," Journal of Artificial Intelligence Research, Aug. 1993, 23 pages.
Widergren et al., "Residential Real-time Price Response Simulation," IEEE Power and Energy Society General Meeting, pp. 3074-3078 (Jul. 2011).
Wilson et al., "Equivalent Thermal Parameters for an Occupied Gas-Heated House," ASHRAE Trans.; (United States), 91(CONF-850606-), 1985, pp. 1875-1885.
Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," Center for the Study of Energy Markets (2007)).
Yang, "Adaptively Robust Kalman Filters with Applications in Navigation," Chapter 2 of Sciences of Geodesy-1, Jun. 2010, pp. 49-82.
Yang et al., "Consensus Based Approach for Economic Dispatch Problem in a Smart Grid," IEEE Transactions on Power Systems, vol. 28, No. 4, Nov. 2013, pp. 4416-4426.
Ygge et al., "Decentralized Markets versus Central Control: A Comparative Study," Journal of Artificial Intelligence Research, vol. 11, Oct. 1999, pp. 301-333.
Ygge et al., "Making a Case for Multi-Agent Systems," Research Report 4/97, University of Karlskrona/Ronneby, Sweden 23 pages (also published as Ygge et al., "Making a Case for Multi-Agent Systems," in Multi-Agent Rationality, pp. 156-176, Springer Berlin Heidelberg (1997)).
Ygge, "Market-Oriented Programming and its Application to Power Load Management," Lund University, Ph.D. Thesis, 1998.
Ygge et al., "Power Load Management as a Computational Market," document not dated, 14 pages (published as Ygge et al., "Power Load Management as a Computational Marked," Proceedings of the 2nd International Conference on Multi-Agent Systems (ICMAS '96), pp. 393-400, (1996).
Yin et al., "A Novel Double Auction Mechanism for Electronic Commerce: Theory and Implementation," IEEE Proc. of the Third Int'l Conf. on Machine Learning and Cybernetics, pp. 53-58 (Aug. 2004).
Zhang et al., "Aggregated Modeling and Control of Air Conditioning Loads for Demand Response," IEEE Transactions on Power Systems, vol. 28, No. 4, Nov. 2013, pp. 4655-4664.
Zhang et al., "Convergence Analysis of the Incremental Cost Consensus Algorithm Under Different Communication Network Topologies in a Smart Grid," IEEE Transactions on Power System, vol. 27, No. 4, Nov. 12, pp. 1761-1768.
Zhang et al., "Decentralizing the Economic Dispatch Problem using a Two-Level Incremental Cost Consensus Algorithm in a Smart Grid Environment," In 2011 North American Power Symposium (NAPS), IEEE, Aug. 4-6, 2011, 7 pages.
Non-Final Office Action issued in U.S. Appl. No. 14/866,457, dated Mar. 13, 2018, 18 pages.
Notice of Allowance for U.S. Appl. No. 14/866,457, dated Sep. 4, 2018, 9 pages.

\* cited by examiner

COORDINATION OF THERMOSTATICALLY CONTROLLED LOADS

CROSS-REFERENCE TO RELATED APPLICATIONS

This application claims the benefit of U.S. Provisional Patent Application No. 62/056,212, entitled "ON MARKET-BASED COORDINATION OF THERMOSTATICALLY CONTROLLED LOADS WITH USER PREFERENCE," filed Sep. 26, 2014, and U.S. Provisional Patent Application No. 62/056,221, entitled "A MARKET MECHANISM DESIGN APPROACH FOR COORDINATION OF THERMOSTATICALLY CONTROLLED LOADS WITH UNKNOWN PARAMETERS," filed Sep. 26, 2014, which applications are incorporated herein by reference in their entireties.

ACKNOWLEDGMENT OF GOVERNMENT SUPPORT

This invention was made with Government support under Contract DE-AC0576RL01830 awarded by the U.S. Department of Energy. The Government has certain rights in the invention.

BACKGROUND

The number of sensors and controllers connected to the electric power system is expected to grow by several orders of magnitude over the next several years. However, the information networks that are currently used to transmit and analyze data on the system are ill-equipped to handle the volume of communications resulting from the increased number of sensors. For example, the current information networks are incapable of delivering large amounts of data collected by the sensors in a predictable, time-effective, and reliable manner.

Without the ability to effectively manage and use data from the sensors, the deployment of sensors into the power grid (e.g., phasor measurement sensors into the transmission system and smart meters into the distribution system) will not result in the desired improvements. For example, existing bidding strategies for wholesale market are not readily adaptable to thermostatically controlled loads implemented at the consumer side. Further, requirements for multiple bidding iterations, large amounts of bid data, and an inability to encode private information into consumer bids hampers deployment of successful strategies for control schemes for demand response. Accordingly, there is ample opportunity for improved systems, methods, and apparatus for managing and using data in a power grid or other electric power distribution system.

SUMMARY

Apparatus and methods are disclosed for the design, analysis, testing, and manufacture of devices used to coordinate groups of thermostatically controlled loads (TCLs) to achieve system-level objects with price incentives. In some examples, the framework is based on improving social welfare of the system subject to one or more feeder power constraints. In the framework, each individual load submits a bid to the market based on its current state. The market collects all the bids and determines the cleared price accordingly. After receiving the cleared price, each individual load makes the local control decision to maximize its utility. This framework can provide a solid mathematical foundation to the disclosed transactive control techniques.

In some examples of the disclosed technology, a method of providing power to a load via a power grid by submitting bids to a market coordinator includes determining an energy response relating price data for one or more energy prices to quantity data for power to be consumed by the load, the load being coupled to receive power from the power grid and sending a bid for power for a finite time period based on the energy response to the coordinator.

In some examples, a method of providing power further includes receiving a clearing price from the coordinator responsive to sending the bid, where the clearing price is based at least in part on the bid and on bids received from a plurality of additional loads. In some examples, the method further includes, responsive to the sending the bid to the load, sending power received from the power grid.

In some examples of the method, the energy response is a function based on at least one or more of the following: a consumption state of the load, an air temperature, and/or an inner mass temperature. In some examples, the energy response is a function of a user response parameter, the user response parameter relating energy price, and a selected user comfort level. In some examples, the energy response is based at least in part on an equivalent thermal parameter model and a control policy indicating one or more power states for the load. In some examples, the bid includes one price and one corresponding quantity. In some examples, the bid includes two or more prices and two or more respectively corresponding quantities. In some examples, the bid is based on a point between two vectors relating a state of the load, a model parameter, and a user input parameter. In some examples, the bid is based at least in part on an equivalent thermal parameter model. In some examples, the finite time period is less than one hour.

In some examples, a controller for operating a thermostatically-controlled load includes one or more sensors configured to generate temperature data used to determine the energy response, a network adapter configured to transmit the bid to the coordinator, one or more processors, one or more actuators configured to activate and/or deactivate the thermostatically-controlled load responsive to one or more signals received from the processors, one or more computer-readable storage media storing computer-executable instructions that when executed by the processors, cause the controller to perform the disclosed computer-implemented methods.

In some examples of the disclosed technology, a method of allocating power to a plurality of loads coupled to a power grid using a market coordinator includes receiving one respective bid for each of the loads, each of the received bids being generated based on an energy response relating a price and a quantity of power bid for a bidding time period for the respective load, determining a clearing price for the plurality of bids, and transmitting the clearing price to each of the loads. In some examples, the method includes sending power to a selected one or more of the loads, the loads being selected based on the received bids and the clearing price. In some examples, the determining the clearing price comprises producing a demand curve by ordering the received bids according to their respective prices.

In some examples, each of the bids includes an energy to price function according to a parameter vector that is substantially identical for each of the respective loads.

In some examples, a method of allocating power to a plurality of loads coupled to a power grid includes comparing a total quantity of power bid for the plurality of loads to a feeder power constraint representing the maximum power to be generated during the bidding time period. Based on the comparing: if the total quantity of power bid is less than the feeder power constraint, then selecting the clearing price based on a wholesale market price, and if the total quantity of power bid is greater than the feeder power constraint, then selecting the clearing price such that the power consumed by bids exceeding the clearing price does not exceed the feeder power constraint.

In some examples of the disclosed technology, a market-based control system configured to coordinate a group of thermostatically controlled loads to achieve system-level objectives with pricing incentives includes a market coordinator configured to generate clearing price data based on a plurality of bids specifying a quantity and a price for consuming power. The system further includes thermostatically controlled loads (TCLs), each of the TCLs being configured to transmit bid data for their respective bids to the market coordinator specifying a bid quantity and a bid price for power received via a power grid for a predetermined time period. In some examples, each of the TCLs is further configured to consume or not consumer power from the power grid based at least in part on the clearing price data and the TCLs' respective bid for the predetermined time period. The system includes computer network configured to transmit the bid data and the clearing price data between the market coordinator and each of the TCLs.

Some examples of the market-based control system further include a power grid configured to distribute power to the TCLs based at least in part on a market cleared by the market coordinator. In some examples of the system, a power generation market administrator is configured to send wholesale energy price data to the market coordinator, the wholesale energy price data being used at least in part to determine the clearing price data.

In some examples of the disclosed technology a power grid includes an electric power distribution system configured to transmit electric power from one or more power sources to a plurality of thermostatically controlled loads and a market coordinator configured to perform any of the disclosed methods.

In some examples of the disclosed technology, one or more computer-readable storage media store computer-executable instructions that when executed by a computer, cause the computer to perform any of the disclosed computer-implemented methods.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

DETAILED DESCRIPTION

I. General Considerations

Figure 1:
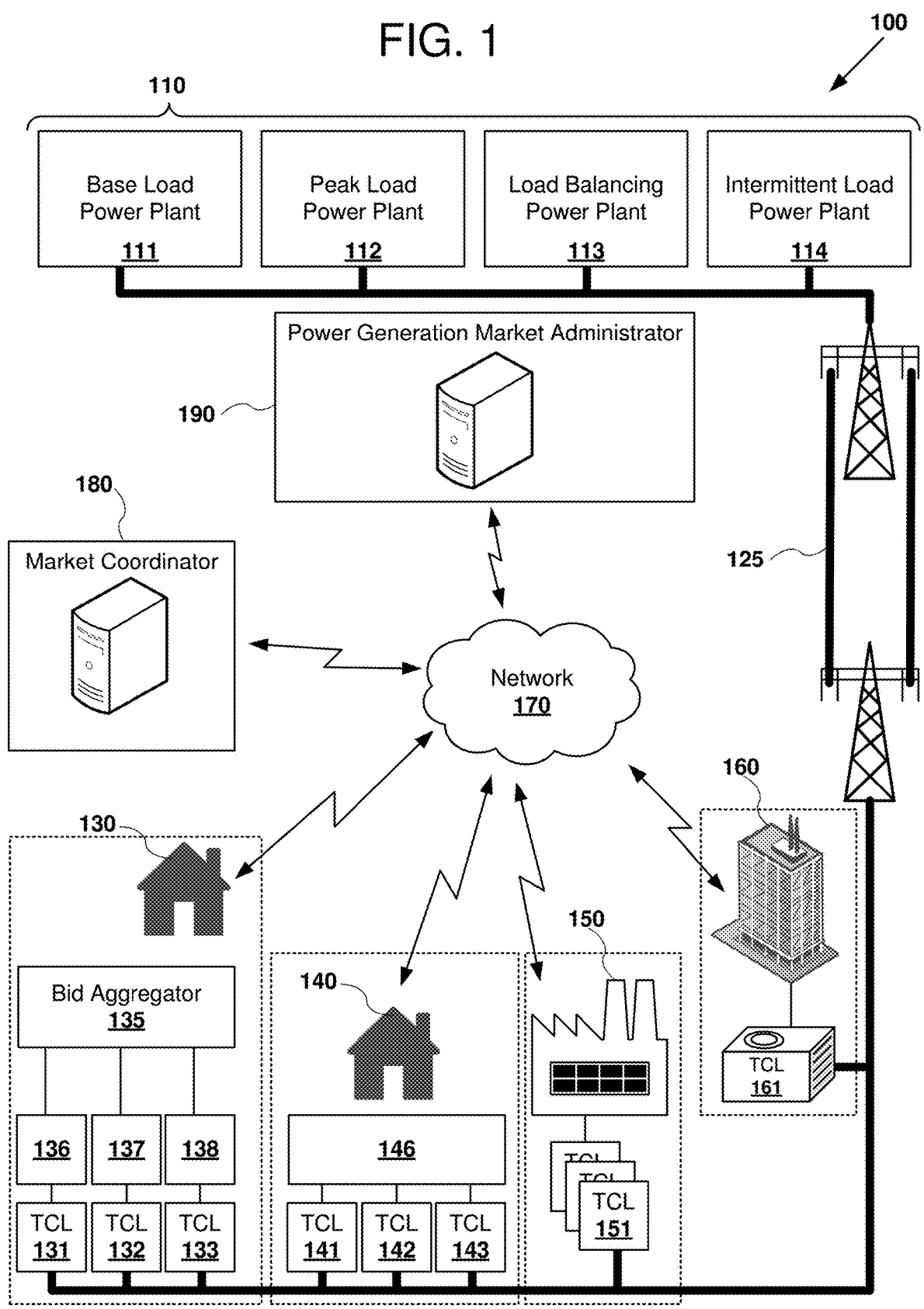
FIG. 1 illustrates an example environment in which certain apparatus and methods, including a market coordinator, can be implemented according to the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way.

Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with controllers and coordinators. For example, the integrated circuit can be embedded in or otherwise coupled to a generator (e.g., a wind-based generator, solar-based generator, coal-based generator, or nuclear generator), an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger; or home electrical system.

II. Introduction to the Disclosed Technology

Methods and apparatus are disclosed for implementing market based control frameworks to coordinate a group of autonomous Thermostatically Controlled Loads (TCL) to achieve system-level objectives with pricing incentives.

Examples of TCLs that can be coordinated according to the disclosed technology include air conditioners, heat pumps, hot water heaters, refrigerators, plug-in hybrid electric vehicles, and commercial and industrial loads. The electricity consumption of TCL can be modulated while still meeting desired end-user temperature requirements due to the inherent thermal storage properties of TCLs.

In some examples of the disclosed technology, the framework is configured to maximize social welfare subject to a feeder power constraint. The framework allows a market coordinator to affect the aggregated power of a group of dynamical systems, and creates an interactive market where the users and the coordinator cooperatively determine the optimal energy allocation and energy price. An optimal pricing strategy is derived, which maximizes social welfare while respecting the feeder power constraint. The bidding strategy is also designed to compute the optimal price in real time based on local device information. Numerical simulations based on realistic price and model data are performed. The simulation results demonstrate that the proposed approach can effectively maximize the social welfare and reduce power congestion at key times.

In one embodiment, an optimal pricing strategy is proposed, which maximizes the social welfare while respecting the feeder constraint. A bidding strategy is also proposed to enable the numerical computation of the optimal price. In some examples of the disclosed technology, certain advantages can be realized. First, the proposed pricing strategy has been proven optimality, where social welfare can be maximized while the feeder power constraint is respected. Second, certain disclosed proposed bidding strategies provide the market with a minimum amount of information that is sufficient for the market to implement an optimal pricing strategy. This enables implementation of the disclosed framework in real time (e.g., by clearing a market using one bid from each load in a 5-minute period).

The disclosed technology provides a foundation for a fully dynamic version of market-based control of Thermostatically Controlled Loads to maximize the social welfare over multiple control periods. In such cases, all loads bid a price vector for the entire planning horizon, and the market is cleared with all prices for the subsequent periods within the horizon. Thus, social welfare can be maximized for multiple periods, and shape the power consumption, thereby flattening the power curve.

Disclosed bidding strategies enables a market coordinator to estimate aggregate power demand in response to market prices more accurately. Therefore, given a power trajectory, the market coordinator can determine the cleared price to coordinate loads to match the power trajectory reference in real time.

In certain examples of the disclosed technology, a group of TCLs are coordinated by a market coordinator with price incentives to limit aggregated power demand and improve system efficiency. Each device adjusts its temperature setpoint control in response to the energy price to maximize individual utility. The change on the setpoint control will then modify the system dynamics and affect the system state, on which the generated bid is based. According to the received load bids, the coordinator clears the market with a price for the next cycle to maximize social welfare subject to a feeder power constraint. A systematic mathematical framework is provided for the analysis and design of this kind of market-based coordination of responsive loads with nontrivial dynamics.

In some examples of the disclosed technology, a market-based coordination framework includes a coordinator that coordinates a group of autonomous TCLs to achieve system-level objectives with price incentives. In some examples, adapting the technology to TCLs allows incorporation of more realistic load dynamics into a market-based coordination framework. In some examples, the framework allows for the users to indicate their preferences regarding how TCL temperature setpoints respond to market clearing price(s). In this way, an interactive market is created for the coordinator and the users cooperatively determine energy allocation in a decentralized manner. In some examples, an optimal price is found to align individual optimality and social optimality. This property does not hold in general when the feeder power constraint is imposed on the system. In some examples, the devices can only bid once during each market clearing cycle. Thus, multiple iterations between the load controllers and market coordinator for each market clearing cycle, which demands considerable communication and computational resources, can be avoided.

Optimal pricing strategies are disclosed, which maximize the social welfare of the system, subject to a feeder power constraint. Load device bidding strategies are also presented to compute the optimal price numerically in real time while respecting the computational and communication constraints of the system. The effectiveness of the disclosed technology is demonstrated via a number of simulations based on realistic models of residential air conditioning loads. Disclosed frameworks can effectively cap the aggregated power below the feeder capacity and thus maximize the social welfare.

III. Example Coordinated Power Grid Network

A diagram 100 illustrating an example of a possible network topology for an environment implementing coordination of thermostatically controlled loads (TCLs) according to the disclosed technology is depicted in FIG. 1. As shown, a number of energy sources 110, including a base load power plant 111 (e.g., a coal, nuclear, or hydroelectric power plant), a peak load power plant 112 (e.g., a gas or diesel turbine electric generator), a load balancing power plant 113 (e.g., pumped water storage or battery energy storage plants), and an intermittent load power plant 114 (e.g., including photovoltaic and other solar-based electric generators, wind turbines, and tidal energy sources) are coupled to a power grid 120. As will be readily understood to one of ordinary skill in the relevant art, the classification of energy sources 110 is for illustrative purposes to demonstrate the extent of power sources that can be used with the technologies used herein.

The power grid 120 includes transmission lines 125 that carry power from the energy sources 110 to a number of loads, including thermostatically-controlled loads. Energy consumers with suitable TCLs for deploying in the illustrated environment include residential consumers, including residential consumers 130 and 140, industrial consumers, such as industrial consumer 150, and commercial consumers, such as commercial consumer 160. Each of the associated consumers 130, 140, 150, and 160 is associated with one or more thermostatically-controlled loads. For example, the residential consumer 130 has three thermostatically-controlled loads (TCL) 131-133. Further, as shown, each of the TCLs 131-133 is coupled to a controller 136-138, respectively. Each of the controllers 136-138 can submit bids and receive clearing prices via a bid aggregator 135, and actuate their respective coupled TCLs 131-133 (e.g., by turning the associated load on or off by activating/deactivating the load). Additionally, residential consumer 140 has a number of TCLs 141-143 that are coupled to a single controller 146. The controller 146 can submit bids, receiving clearing prices, and actuate any of the coupled TCLs 141-143. Industrial consumer 150 has a number of TCLs (e.g., TCL 151) (controller(s) and any bid aggregator(s) being omitted from FIG. 1 for simplicity), and commercial consumer 160 has a number of TCLs (e.g., TCL 161) (controller(s) and any bid aggregator(s) being omitted from FIG. 1 for simplicity).

Each of the TCLs is coupled to a controller that is operable to submit data to and receive data from other components via a computer network 170. In some examples, a number of TCLs associated with a single consumer can have data aggregated and bids submitted together using a bid aggregator (e.g., bid aggregator 135). In some examples, one or more of the TCL controllers are implemented using a microcontroller, memory, and suitable input/output resources for receiving signals carrying sensor data local to the TCL and controlling the coupled TCL (e.g., by actuating motors and other components of a respective TCL). In other examples, TCL controllers can be implemented using programmable logic or a general-purpose computer configured to receiving signals carrying signal data and generate signals for controlling the coupled TCL.

Each of the TCLs can be coupled to, for example, computing devices having computer hardware that run software or is otherwise configured to communicate with other computing devices accessible by the network 170. In other examples, the TCLs send data to other computing devices associated with one or more of the energy consumers. Each of the controllers coupled to and/or associated with the TCLs, a market coordinator 180, and a power generation market administrator 190 can have computer architecture(s) similar to those illustrated in FIG. 2 and further discussed below. The computing devices associated with the TCLs, the coordinator, and the administrator, are not limited to traditional personal computer and server architectures, but can comprise other computing hardware configured to connect to and communicate with the network 170 (e.g., specialized computing hardware associated with an electrical device or a power generator, including hardware comprising one or more integrated circuits such as ASIC or programmable logic devices configured to perform any of the disclosed methods).

As shown in FIG. 1, each of the energy consumers 130, 140, 150, and 160 can send and receive data via the network to the market coordinator 180. The market coordinator 180 receives bid data from energy consumers and transmits coordination data, such as clearing prices back to energy consumers. The market coordinator 180 can also communicate with the power generation market administrator 190 in order to, for example, receive wholesale energy price data from producers associated with the energy sources 110. Before each market clearing cycle, each device can measure its current room temperature and submit a bid based on a calculated energy response to the market coordinator 180.

In the illustrated example, the TCLs are configured to determine an energy response relating price data for one or more energy prices to quantity data for power to be consumed by the associated TCL and to send bids for power for a finite time period based on the energy response to the market coordinator 180. In some examples, each of the TCLs submits a single bid to the mark coordinator 180 for each finite time period. In other examples, additional bids are submitted in an iterative process. The market coordinator 180 in turn aggregates bids from a number of energy consumers participating in the market for the finite time period, and calculates a clearing price. The clearing price is transmitted from the market coordinator 180 to each of the energy consumers. The energy consumers respond to the clearing price by, for example, actuating their associated loads to activate or de-activate, thereby consuming, or not consuming, respectively, energy from the power grid according to the clearing price. For example, if an energy consumer did not bid a sufficient price to be allocated energy by the market coordinator, that consumer, a controller associated with the TCL, will not activate the device. Conversely, if a bid submitted for an associated TCL was sufficient to receive power, the controller can activate the associated thermostatically-controlled load. While the examples disclosed herein respond to the clearing price by either activating or de-activating the load, in other examples a finer-grained response of the loads can be performed (e.g., by consuming a portion of the loads maximum energy consumption). In some examples, the market coordinator 180 itself sends signals to activate or de-activate the loads, accordingly.

It should be noted that in some examples, individual TCLs associated with an energy consumer can submit different price and/or quantity values in their bid to the market coordinator 180 and thus, in certain instances, only a subset of TCLs associated with a particular TCL will be activated or de-activated according to the clearing price. As will be more fully explained below, this process can be repeated at fixed intervals (e.g., intervals of one hour or less, intervals of ten minutes or less, or intervals of five minutes or less).

In the illustrated example of FIG. 1, controllers coupled to the TCLs are accessed using the network 170, which can be implemented as a local area network ("LAN") using wired networking (e.g., using IEEE standard 802.3 or other appropriate wired networking standard), fiber optic cable, cable modem (e.g., using the DOCSIS standard), and/or wireless networking (e.g., IEEE standards 802.11a, 802.11b, 802.11g, or 802.11n, Wi-Max (e.g., IEEE standard 802.16), a metropolitan area network ("MAN"), satellite networking, microwave, laser, or other suitable wireless networking technologies). In certain examples, at least part of the network 170 includes portions of the internet or a similar public network. In certain examples, at least part of the network 170 can be implemented using a wide area network ("WAN"), a virtual private network ("VPN"), or other similar public and private computer communication networks. In some examples, controllers associated with the TCLs are located near or at a transmission node of the power grid 120 itself (e.g., in a distribution substation, subtransmission substation, transmission substations, or other nodal locale) or can alternatively be located remotely from the transmission node (e.g., at a centralized location such as using a central computing device that performs computations from multiple transmission nodes). In some examples, controller associated with the TCLs are coupled directly to the TCL, or located at another location within a residence, industrial building, or commercial building.

The various possible roles and functionalities of the TCLs, market coordinator 180, and power generation market administrator 190 will be described in more detail in the following sections.

IV. Example Computing Environment

Figure 2:
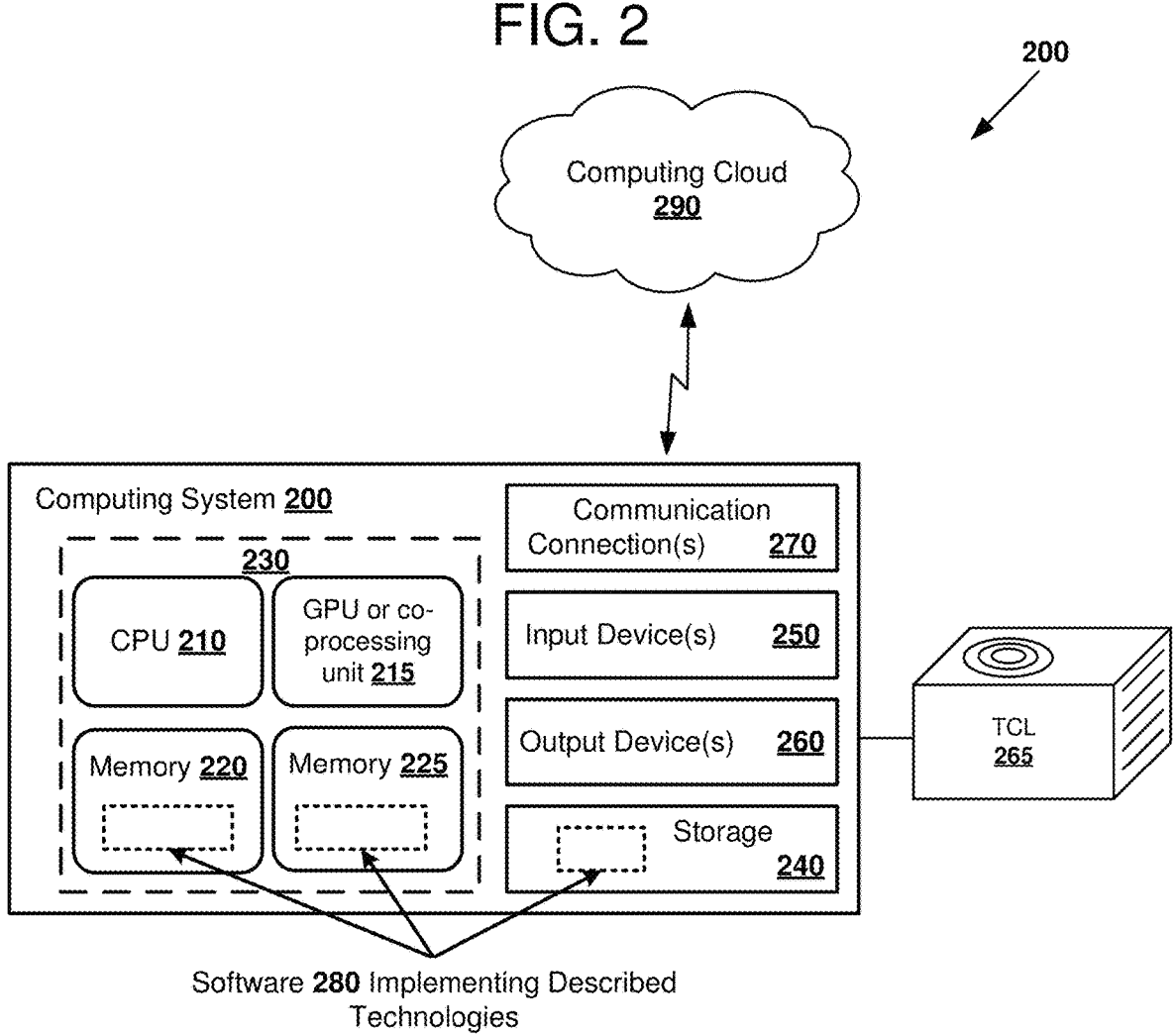
FIG. 2 illustrates an example computing environment in which certain examples of the disclosed technology can be implemented.

FIG. 2 illustrates a generalized example of a suitable computing environment 200 in which described embodiments, techniques, and technologies, including determining an energy response, generating and sending bids, and market coordination can be implemented. For example, the computing environment 200 can implement any of the TCL controllers, market coordinators, and/or market administrators, as described herein.

The computing environment 200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 2, the computing environment 200 includes at least one central processing unit 210 and memory 220. In FIG. 2, this most basic configuration 230 is included within a dashed line. The central processing unit 210 executes computer-executable instructions and may be a real or a virtual processor. In a multi-processing system, multiple processing units execute computer-executable instructions to increase processing power and as such, multiple processors can be running simultaneously. The memory 220 may be volatile memory (e.g., registers, cache, RAM), non-volatile memory (e.g., ROM, EEPROM, flash memory, etc.), or some combination of the two. The memory 220 stores software 280, images, and video that can, for example, implement the technologies described herein. A computing environment may have additional features. For example, the computing environment 200 includes storage 240, one or more input devices 250, one or more output devices 260, and one or more communication connections 270. An interconnection mechanism (not shown) such as a bus, a controller, or a network, interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, CD-RWs, DVDs, or any other medium which can be used to store information and that can be accessed within the computing environment 200. The storage 240 stores instructions for the software 280, plugin data, and messages, which can be used to implement technologies described herein.

The input device(s) 250 may be a touch input device, such as a keyboard, keypad, mouse, touch screen display, pen, or trackball, a voice input device, a scanning device, or another device, that provides input to the computing environment 200. For audio, the input device(s) 250 may be a sound card or similar device that accepts audio input in analog or digital form, or a CD-ROM reader that provides audio samples to the computing environment 200. The input device(s) 250 can also include sensors and other suitable transducers for generating data about the environment such as room temperature, humidity, and status information for one or more TCLs (e.g., TCL 265). The output device(s) 260 may be a display, printer, speaker, CD-writer, or another device that provides output from the computing environment 200. The output device(s) 260 can also include interface circuitry for sending actuating commands to the TCLs, (e.g., TCL 265), for example, to activate or deactivate actuators (e.g., motors, solenoids, hydraulic actuators, pneumatic actuators, etc.) the TCL, or to request sensor or other data from the TCL.

The communication connection(s) 270 enable communication over a communication medium (e.g., a connecting network) to another computing entity. The communication medium conveys information such as computer-executable instructions, compressed graphics information, video, or other data in a modulated data signal. The communication connection(s) 270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 270 are used to supplement, or in lieu of, the input device(s) 250 and/or output device(s) 260 in order to communicate with the TCLs and/or sensors.

Some embodiments of the disclosed methods can be performed using computer-executable instructions implementing all or a portion of the disclosed technology in a computing cloud 290. For example, data acquisition and TCL actuation can be performed in the computing environment while computing energy response functions or bid generation can be performed on servers located in the computing cloud 290.

Computer-readable media are any available media that can be accessed within a computing environment 200. By way of example, and not limitation, with the computing environment 200, computer-readable media include memory 220 and/or storage 240. As should be readily understood, the term computer-readable storage media includes the media for data storage such as memory 220 and storage 240, and not transmission media such as modulated data signals.

V. Example Consumer Controller

Figure 3:
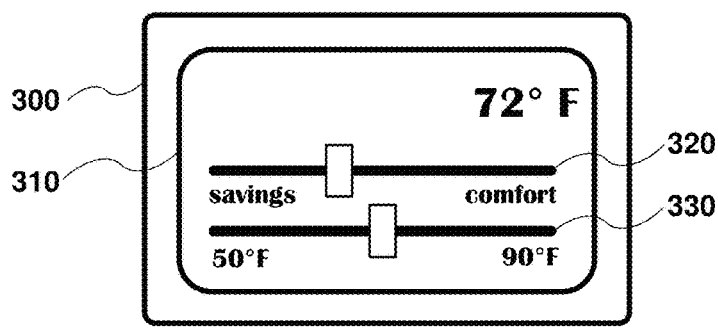
FIG. 3 illustrates a controller interface, as can be used in certain examples of the disclosed technology.

FIG. 3 depicts a controller 300 including a touch screen display 310 as can be used to control energy loads, including thermostatically controller loads (TCLs), in certain examples of the disclosed technology. As shown, the controller 300 includes user preference controls, including a user preference control 320, which allows a user to weight energy savings versus comfort, and a temperature control 330, which can be used to indicate a desired room air temperature. Data input using such user controls can be used in generating energy response, for example, energy response functions that relate price data to quantity data for power to be consumed by a load coupled to the controller 300. In some examples, the controller includes hardware for actuating associated TCLs, while in other examples, the controller sends signals to other hardware in order to actuate associated TCLs. In some examples, each TCL is associated with a single controller, while in other examples, a single controller is used to generate energy response data and send bids for two or more TCLs. In some examples of the disclosed technology, both the response and bidding processes are automatically executed by a programmable controller (e.g., controller 300). The user can slide the control bars to indicate user preferences, which is reflected in the energy response used to calculate bids.

VI. Example Market-Based Coordination Framework

Apparatus and methods are disclosed for implementing market-based coordination frameworks for TCLs. In an exemplary embodiment, a market coordinator procures energy from the wholesale market and manages N users to maximize the social welfare subject to a feeder power constraint. $C(\alpha)$ represents the cost for the coordinator to procure $\alpha$ unit of energy from the wholesale market. The unit price can then be the Locational Marginal Price plus some additional charge for using the distribution network. For ease of explanation for this example, it is assumed that C is convex and continuously differentiable.

The market is cleared (e.g., by the market coordinator) every T units of time. At the beginning of each time cycle, each of the local devices receives the energy price and make control decisions to maximize its individual utility. This control decision affects the load dynamics and state, and in turn influences user bidding for the next market clearing cycle. After collecting all the device bids, the coordinator determines the price such that the social welfare is maximized, and the aggregated power does not exceed the feeder power constraint. As used herein, the aggregated power is the average power consumed during each market cycle.

VII. Example Method of Market Coordination for Energy Load Coordination

Figure 4:
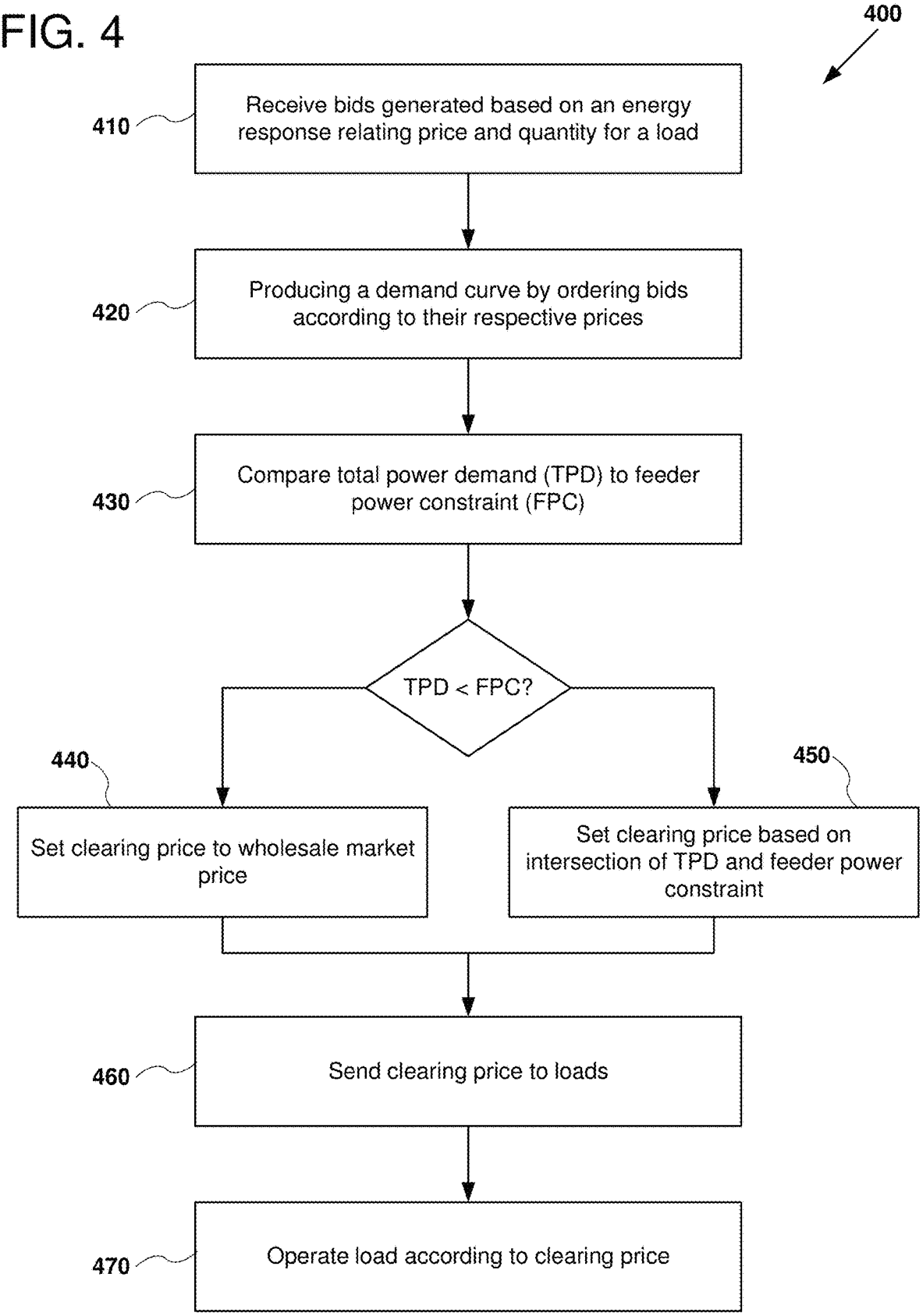
FIG. 4 illustrates an example method of setting a clearing price, as can be performed in certain examples of the disclosed technology.

FIG. 4 is a flowchart 400 outlining an example method of performing market coordination according to the disclosed technology. For example, the network environment illustrated in FIG. 1, computing environments such as those illustrated in FIG. 2, and controllers with user interfaces such as those described above regarding FIG. 3 can be used to perform the illustrated method.

At process block 410, a number of bids are received for a plurality of energy loads that were generated based, at least in part on, an energy response relating price and quantity for a load. For example, each of a number of thermostatically-controlled loads (TCLs) can send bids expressed as a single price quantity pair, or as a plurality of two or more price quantity pairs. In other examples, more complex expressions of bids are received. Each of the bids can be associated with a single TCL, or represent an aggregated bid for two or more TCLs. Each of the bids for those TCLs participating in the market are for a finite time duration (e.g., five minutes). Once bids have been received for the associated TCLs, the method proceeds to process block 420. In addition to collecting the bids, the coordinator can also calculate the uncontrolled power load $Q_{uc}$ and the power feeder constraint $Q_{lim}$ for the finite time period.

At process block 420, a demand curve is produced by ordering the bids received at process block 410 according to their respective prices. For example, a market coordinator can order the received bids in a decreasing sequence from the highest bid to the lowest bid. Thus, energy can be allocated to TCLs associated with higher bids at a higher priority than TCLs associated with lower bids.

Figure 5:
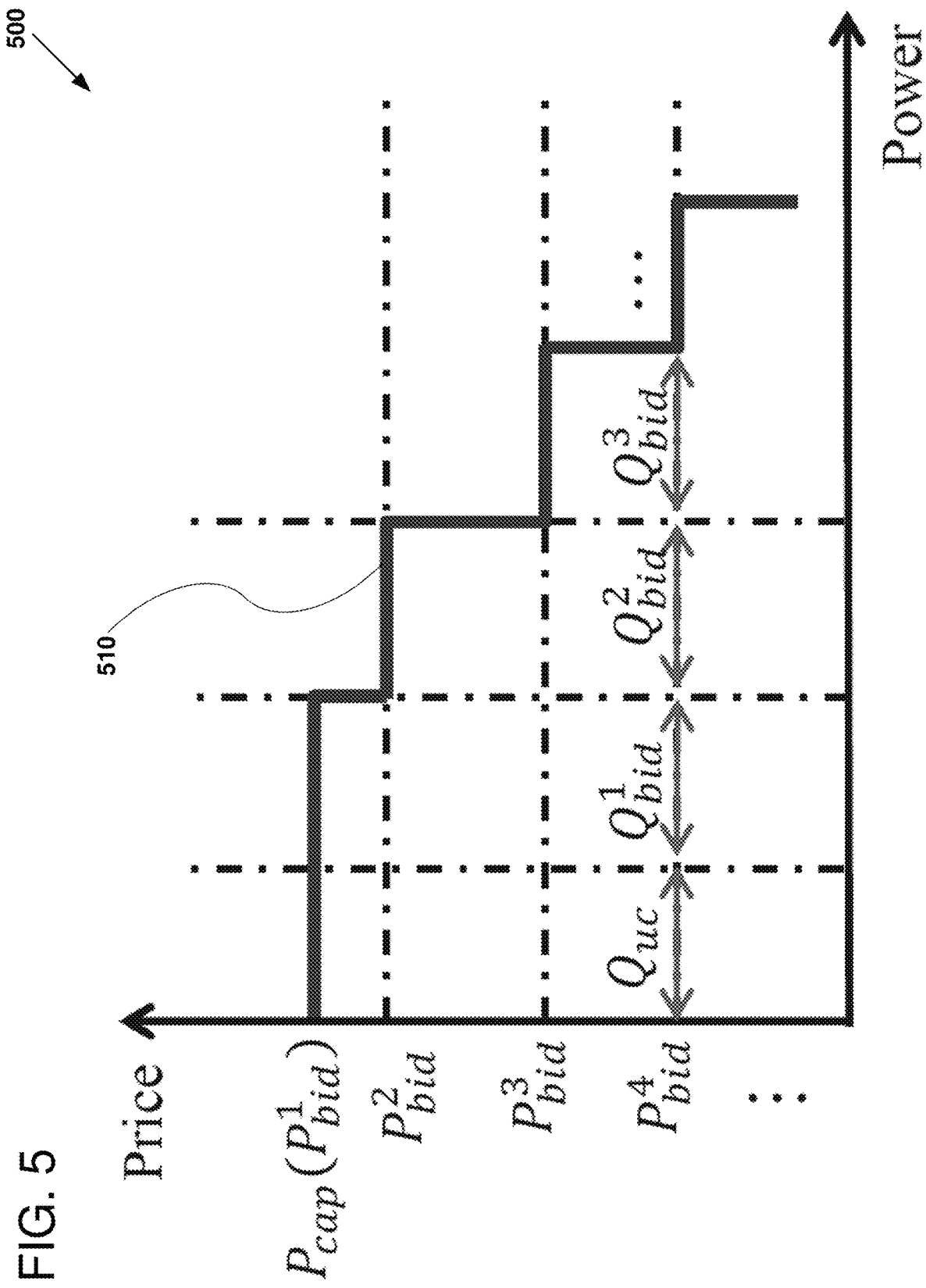
FIG. 5 illustrates an example demand curve based on a number of received user bids, according to certain examples of the disclosed technology.

FIG. 5 is a chart 500 illustrating a demand curve 510 based on a number of received user bids, according to one example of the disclosed technology. As shown in FIG. 5, $P_{bid}^i$ is the bidding price sequence in decreasing order, and $Q_{bid}^i$ is the power of the most recent on cycle. The line $Q_{uc}$ represents the uncontrolled power load, which will consume power essentially regardless of the price. As shown in FIG. 5, the y-axis is ordered according to increasing price, and the x-axis is ordered according to total amount ordered according to the cumulative amount of power bid by the sequenced bids. Thus, the highest bid $P_{bid}^1$ is ordered in the demand curve at the left-most portion and subsequent $P_{bid}^2$, $P_{bid}^3$, $P_{bid}^4$, etc., are arranged in sequence. For example, the demand curve can be produced by the market coordinator 180 described above.

Before each market clearing cycle, the market coordinator collects all the bids from the devices, and orders the bidding price in a decreasing sequence $P_{bid}^1, \ldots, Q_{bid}^1$, where N denotes the number of users. With the price sequence and the associated bidding power sequence $Q_{bid}^1, \ldots, Q_{bid}^N$, the coordinator can construct the demand curve that maps the market energy price to the aggregated power. Using the demand curve 510, the coordinator can clear the market and determine the energy price to ensure that the aggregated power does not exceed the feeder capacity: if the total power demand (the total quantity of power bid) is less than the feeder power constraint, then the clearing price is equal to the base price $P_{base}$ (see FIG. 6, below), which denotes the unit price for the coordinator to purchase energy from the wholesale market; if the total power demand is greater than the feeder power constraint, then the clearing price $P_c$ is determined by the intersection of demand curve and the feeder power constraint (see FIG. 7, below).

Once the demand curve has been produced, the method proceeds to process block 430.

At process block 430, the total power demanded according to all of the bids received is compared to a feeder power constraint. The feeder power constraint indicates the maximum amount of energy that can be provided by energy producers for the upcoming time period that the bids were based on. For example, based on power generation availability, transmission line conditions, and/or regulatory constraints, the feeder power constraint can be determined. If the total power demand is less than the amount of energy according to the feeder power constraint, the method proceeds to process block 440. Conversely, if the total power demand is greater than the feeder power constraint, the method proceeds to process block 450. Comparison of the total power demand to the feeder power constraint can be formed using the market coordinator 180 and the power generation market administrator 190 described above regarding FIG. 1.

At process block 440, because the total power demand was less than the feeder power constraint, the clearing price is set to the wholesale market price. In the depicted embodiment, the clearing price is set to the same value for all bidders in the market for the current finite time period.

Figure 6:
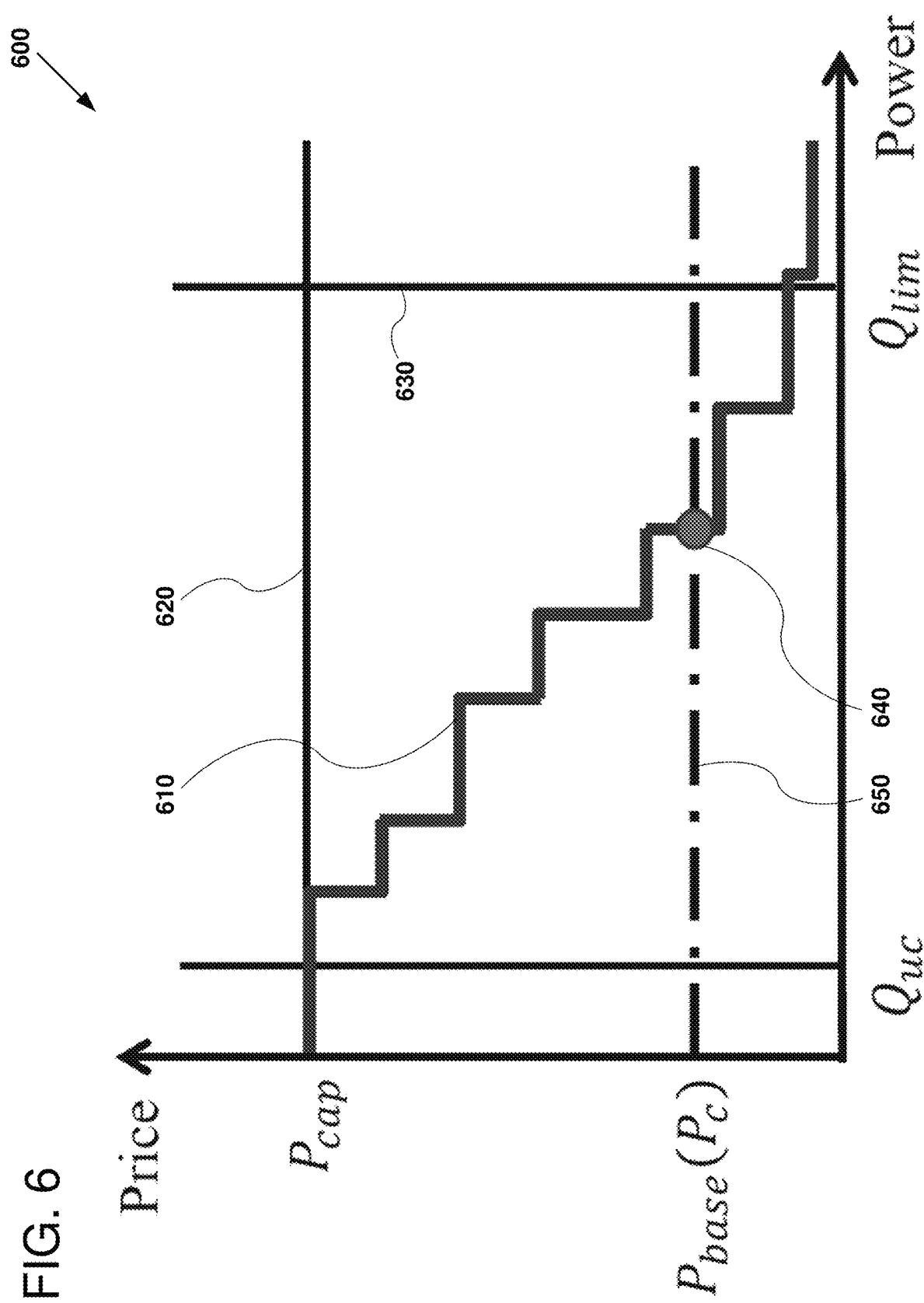
FIG. 6 illustrates an example demand curve constructed based on a number of received bids, where total power demand is less than a feeder power constraint, according to certain examples of the disclosed technology.

FIG. 6 is a chart 600 that illustrates an example demand curve 610 constructed based on all received bids where the total power demand is less than the feeder power constraint, then the clearing price is equal to the base price. A number of constraints are shown in FIG. 6, including $P_{cap}$ 620, which is the maximum price that the power grid is permitted to charge (e.g., due to regulatory constraints), and a feeder power constraint 630 ($Q_{lim}$), which represents the feeder power constraint, in other words, the maximum amount of power available for the finite time period is $Q_{lim}$. $P_{base}$ 650 represents the wholesale market energy price for the finite time period. Thus, because $P_{base}$ intersects the demand curve at a point 640 to the left of the feeder power constraint 630, all of the loads that bid at or above $P_{base}$ will receive power. The market coordinator can effect this by setting the clearing price to the wholesale market price ($P_{base}$).

On the other hand, if it was determined that the total power demand is greater than the feeder power constraint, then method proceeds to process block 450 and the clearing price is set based on the intersection of the total power demand and the feeder power constraint. In the depicted embodiment, the clearing price is set to the same value for all bidders in the market for the current finite time period. In other examples, the clearing price could vary depending on the individual bid received from each of the TCLs.

Figure 7:
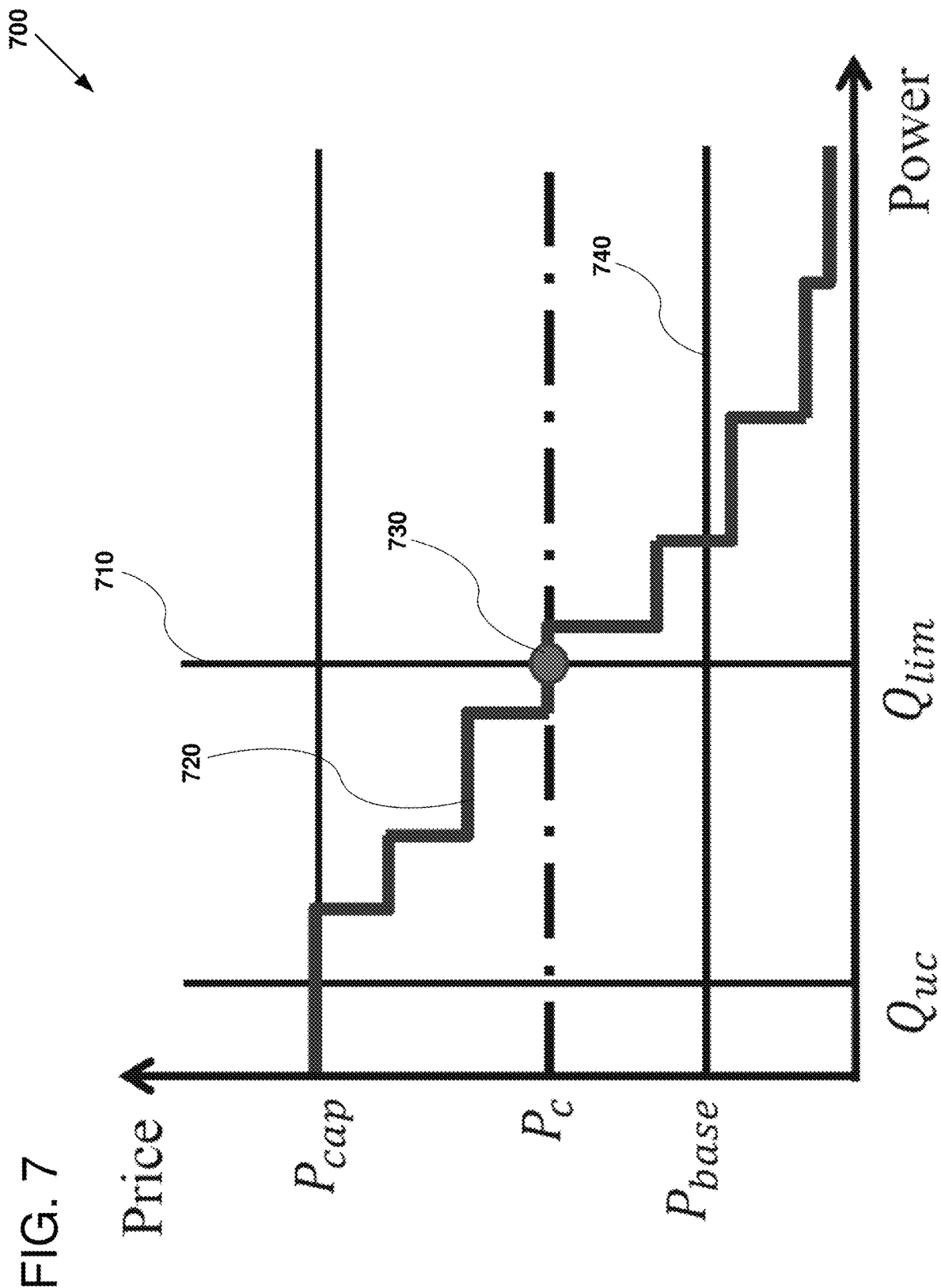
FIG. 7 illustrates an example demand curve constructed based on a number of received bids, where total power demand is greater than a feeder power constraint, according to certain examples of the disclosed technology.

An example of demand curve associated with this situation is illustrated in a chart 700 shown in FIG. 7. As shown, the feeder power constraint 710 ($Q_{lim}$) intersects the demand curve 720 at a point 730. Because the intersection point is above the wholesale energy price 740 ($P_{base}$), power will be allocated to only the highest bidders as shown. In other words, bidders associated with the bids to the left of the feeder power constraint 710 line will receive power, while other, lower bidders will not. The market coordinator 180 can effect this power distribution by setting the clearing price based on the intersection point 730. Thus, bids that were below the clearing price $P_c$ are insufficient for the associated TCL to receive power for the next finite time period. After the clearing price has been set (either at process block 440 or 450), the method proceeds to process block 460.

At process block 460, the clearing price is sent to controllers associated with TCLs that bid in the market. The clearing price can be sent, for example, using a computer network such as computer network 170 from the market coordinator 180 to each of the TCLs. After sending the clearing price to the TCLs, the method proceeds to process block 470.

At process block 470, the controllers associated with each of the bidding TCLs operate their loads according to the clearing price. In other words, if the associated TCL sent a bid greater than or equal to the clearing price, then the associated TCL is allowed to consume the amount of energy that was bid during the market session. For associated TCLs that did not submit a sufficient bid, and did not receive power because the total power demand was greater than the feeder power constraint, the associated controllers will de-activate the associated TCL.

The operations described above in the flowchart 400 can be performed repeatedly for each finite time period. For example, bidding for a next one (or more than one) time period can begin during the time period in which the TCL is operating according to a previously-cleared bid. In some examples, the sequence of bidding and price clearing is performed only once for each finite time period. Thus, communication and processing overhead associated with repeated bidding can be avoided.

In some examples of the method outlined in FIG. 4, each of the plurality of bids includes an energy to price function according to a parameter vector, and the parameter vector is substantially identical for each of the respective loads. Thus, the amount of bid data transmitted with a bid can be reduced by exploiting similarities between different TCLs bidding within the same market.

The example method of market coordination elaborated in FIG. 4 is similar in some respects to uniform price auction models for retail power price settings. In other examples, it may be suitable to adapt the disclosed market coordination technologies to other types of power auction designs, including first-price sealed-bid, pay-as-bid, descending clock, combinatorial, two-sided, or other forms of power auctions, including hybrids of the aforementioned auction designs.

Figure 8:
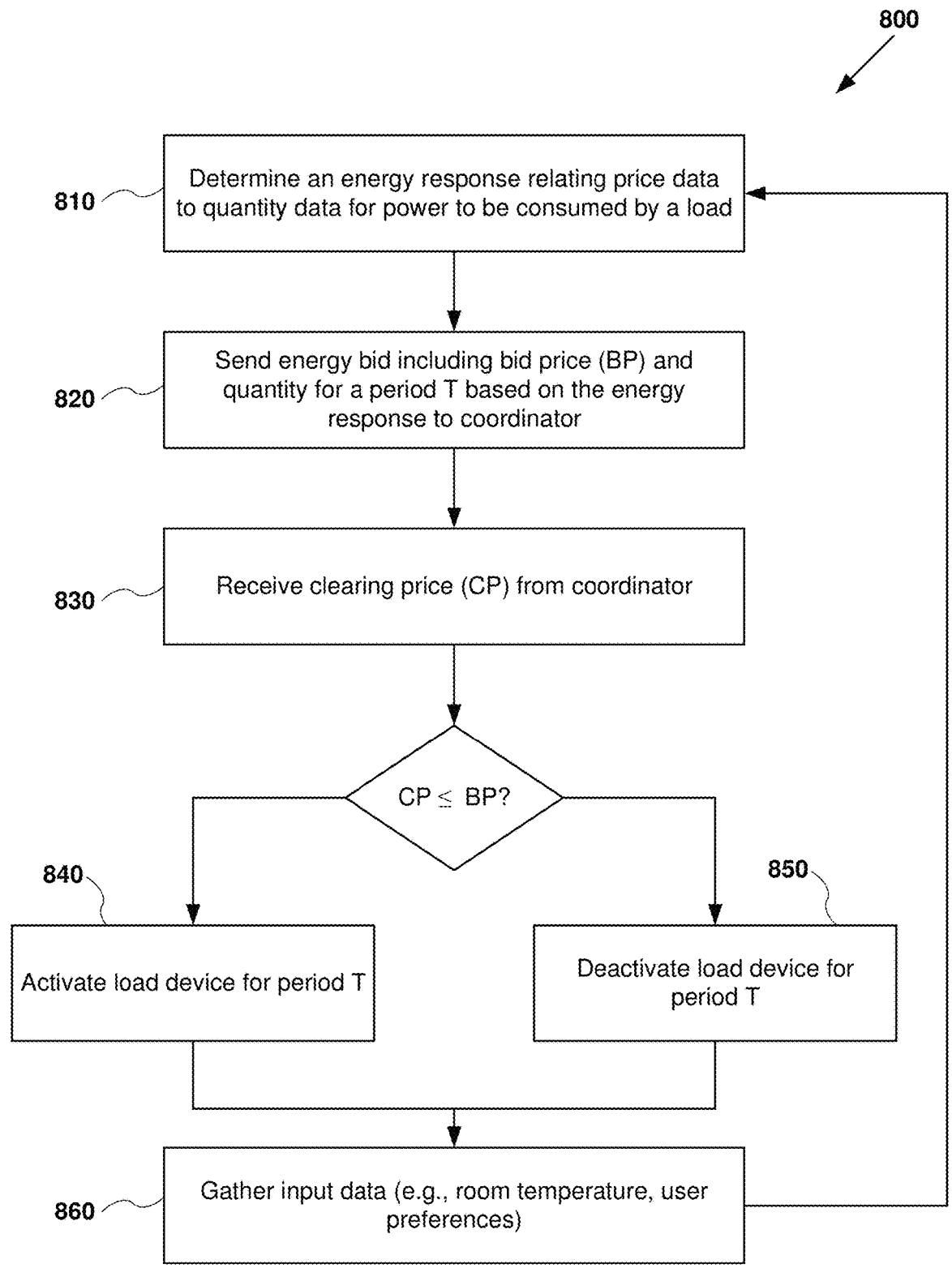
FIG. 8 illustrates an example method of determining an energy response and sending an energy bid to a coordinator, as can performed in certain examples of the disclosed technology.

VIII. Example Method of Producing Energy Response to Generate Bids for Control of Load Devices FIG. 8 is a flowchart 800 outlining an example method of determining an energy response and sending an associated bid to a market coordinator, as can be performed in certain examples of the disclosed technology. For example, the operations outlined in the flowchart 800 can be performed by controllers coupled to the TCLs illustrated in FIG. 1. A computer network (e.g., computer network 170) can be used to transmit bid data to a market coordinator (e.g., market coordinator 180), and to send data such as clearing price data from the market coordinator to controllers associated with the TCLs.

At process block 810, a controller coupled to a TCL determines an energy response relating price data to quantity data for energy or power to be consumed by the associated load. In some examples, the energy response is modeled using a function based on at least one or more of the following: a consumption state of the load (e.g., whether the load is currently operating or not), an air temperature (e.g., the current room temperature), and/or an inner mass temperature (e.g., the current temperature of solid objects within a region being heated or cooled by the associated load). In some examples, one or more of the variables on which the energy response function is based are estimated. For example, the inner mass temperature may not be available by data from a sensor. Other parameters of the energy response function can be provided by a sensor, for example the consumption state of the load, or the current room temperature. In other examples, other variables can be included in the energy response, including time of day, humidity, weather, outside air temperature, solar gain, or other suitable parameters.

In some examples, the energy response is a function of a user response parameter where the user response parameter relates an energy price and a user-selected comfort level. For example, the user can indicate a desired comfort level in relation to price using a controller, such as the controller 300 discussed above regarding FIG. 3.

In some examples, the energy response is based, at least in part, on an equivalent thermal parameter model and a control policy indicating one or more power states for the load. These parameters are discussed further below. In some examples, the bid includes exactly one price and one corresponding quantity. In other examples, the bid includes two or more prices and two or more respectively corresponding quantities. In some examples, the bid is based on a point between two vectors that relate a state of the load, a model parameter, and a user input parameter. In some examples, the bid is based, at least in part, on an equivalent thermal parameter model. In some examples, the finite time period is less than one hour. In some examples, the finite time period is approximately five minutes or ten minutes.

A further detailed explanation of determination of exemplary energy consumption functions and energy response curves are discussed below and illustrated in FIGS. 9-11.

After determining an energy response, data representing the energy response is encoded and the method proceeds to process block 820.

At process block 820, the energy bid for a finite time period T based on the energy response data generated at process block 810 is sent to a market coordinator. For example, the energy bid data can be sent using a wired computer network, a wireless computer network, satellite or radio communication, or other suitable technologies for sending data to the market coordinator. After sending the energy bid to the market coordinator, the method proceeds to process block 830.

At process block 830, a clearing price is received from the market coordinator. The clearing price is based, at least in part, on the bid submitted by the controller at process block 820 in combination with energy bids that were submitted by other energy consumers associated with the same market coordinator. After receiving the clearing price for the associated time period T, the method compares the clearing price to the bid price. If the clearing price is less than the bid price, then the method proceeds to process block 840. If, on the other hand, the clearing price is greater than the bidding price sent at process block 820, then the method proceeds to process block 850.

At process block 840, one or more load devices associated with the controller and the successful energy bid (e.g., a clearing price that was less than or equal to the bidding price) is used to activate the associated load device for the finite time period T. In some examples, the load device is activated at a finer granularity than on/off. The load device is then permitted to consume its bid amount of energy for the corresponding time period.

At process block 850, the controller associated with the load uses an actuator to de-activate the load device for the finite time period T associated with the bid sent at process block 820. Thus, because the bid sent at process block 820 was insufficient, the load device remains idle for the finite time period. After de-activating the load device, the method proceeds to process block 860.

At process block 860, additional input data is gathered (e.g., room temperature, user preferences, inner mass temperatures, and other suitable data. The input data gathered is to be used for determining an energy response for the next time period. Once sufficient input data is gathered, the method proceeds back to process block 810 in order to determine a second energy response for a second finite time period.

A. Example Energy Consumption Function

Figure 9:
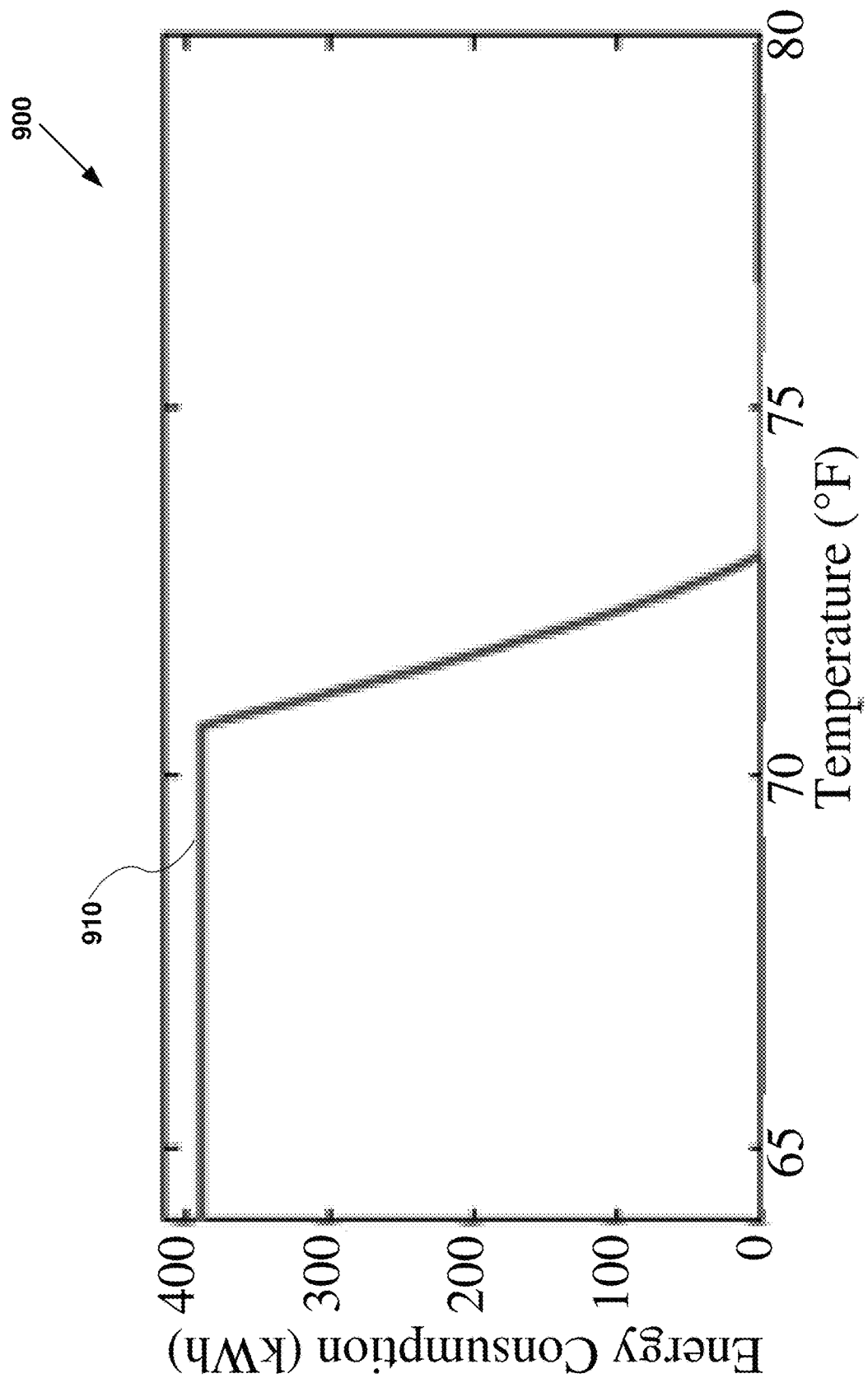
FIG. 9 illustrates energy consumption of a TCL during a market clearing cycle as a function of temperature setpoint, according to certain examples of the disclosed technology.

FIG. 9 is a chart 900 that illustrates a curve 910 for an example energy consumption function according to a second order equivalent thermal parameter model, as can be used in certain examples of the disclosed technology. As shown, the associated TCL is an air conditioning unit that will consume a maximum amount of energy up to a temperature of about 71 degrees Fahrenheit and will then consume a lower amount of energy according to a slope up to about 73 degrees Fahrenheit. Thus, the temperature represents the thermostat set point associated with the air conditioner TCL.

The example energy consumption function $e_i$ is modelled using an Equivalent Thermal Parameter model (e.g., using the model as described above regarding Equation 2). For notational convenience, let $a_i$ represent the energy allocation of ith user, e.g., such that: $a_i = e_i(x_i(t_k), u_i(t_k))$.

Figure 10:
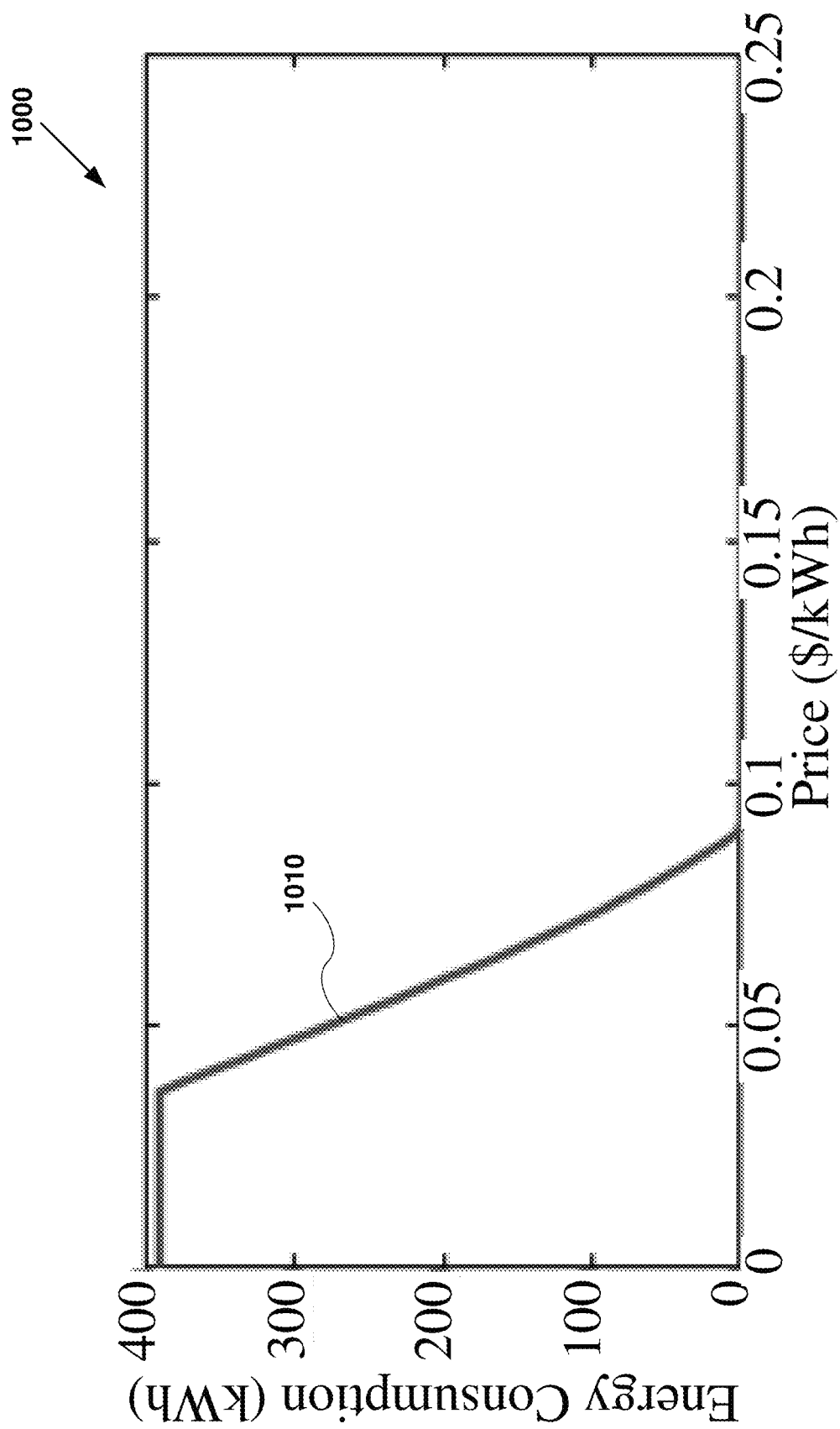
FIG. 10 is energy consumption of the TCL during a market clearing cycle as a function of the energy price.

FIG. 10 is a chart 1000 that illustrates a curve 1010 for the example energy consumption of a TCL during a market-clearing cycle as a function of the energy price, as can be realized in certain examples of the disclosed technology. As shown, when the energy price is approximately four cents or less, the energy consumption is approximately at its maximum, and decreases successfully as the energy price increases up to approximately nine cents.

Determinations of example energy consumption functions, as can be implemented in some examples of the disclosed technology, are discussed in further detail below.

B. Example Individual Load Dynamics

For the following exemplary analysis of individual load dynamics, let $f_{on}^i$ and $f_{off}^i$ $f_{off}^i: R^n \times R^m \to R^n$ denote the dynamics of the ith TCL for on and off state, respectively. Let $z_i(t)$ be the continuous state of load i. Denote $q_i(t) \in R^{n_q}$ as the on/off state: $q_i(t)=0$ when the TCL is off, and $q_i(t)=1$ when it is on. The system dynamics can be expressed as follows as Equation 1:

$$\dot{z}_i(t) = \begin{cases} f_{on}^i(z_i(t); \theta_i^m) & \text{if } q_i(t) = 1 \\ f_{off}^i(z_i(t); \theta_i^m) & \text{if } q_i(t) = 0 \end{cases} \quad \text{(Eq. 1)}$$

where $\theta_i^m \in R^{n_m}$ is the model parameter of the ith TCL. In such an example the thermal dynamics can be captured by a second-order Equivalent Thermal Parameter (ETP) model, for example, as can be shown in Equation 2:

$$\dot{z}_i(t) = A_i z_i(t) + B_{on}^i (B_{off}^i) \quad \text{(Eq. 2)}$$

where $\dot{z}_i(t)$ includes a measured room temperature $T_c^i(t)$ and an inner mass temperature, and the model parameters include $A_i$, $B_{on}^i$ and $B_{off}^i$, such that the model parameter $\theta_i^m = [A_i, B_{on}^i, B_{off}^i]^T$.

In some examples, the power state of a TCL is regulated by a hysteretic controller based on the control deadband: $[u_i(t)-\delta/2, u_i(t)+\delta/2]$, where $u_i(t)$ is the temperature set point of the ith TCL and $\delta$ is the deadband. For example, in air conditioning mode, the controller turns off the system when $T_c^i(t) \leq u_i(t)-\delta/2$, turns on the system when $T_c^i(t) \geq u_i(t)+\delta/2$, and remains in the same power state otherwise. Such a control policy can be represented as follows in Equation 3:

$$q_i(t^+) = \begin{cases} 1 & \text{if } T_c^i(t) \geq u_i(t) + \delta/2 \\ 0 & \text{if } T_c^i(t) \leq u_i(t) - \delta/2 \\ q_i(t) & \text{otherwise} \end{cases} \quad \text{(Eq. 3)}$$

For notational convenience, a hybrid state is defined as $x_i(t) = [q_i(t), z_i(t)]^T$ for the ith TCL. Let $[t_k, t_k+T]$ be the kth market clearing cycle. Energy consumption of the TCL during each market clearing cycle depends on the current state and the control. Therefore, given a state $x_i(t_k)$ and a constant setpoint control $u_i(t_k)$, the portion of time the system is on during a market cycle can be estimated, and hence derive the energy consumption $e_i(x_i(t_k), u_i(t_k))$ of the ith TCL based on the system dynamics and control strategy, where $e_i: \mathbb{R}^{n+1} \times \mathbb{R} \to \mathbb{R}$.

C. Example Calculation of User Preferences and Valuation

Figure 11:
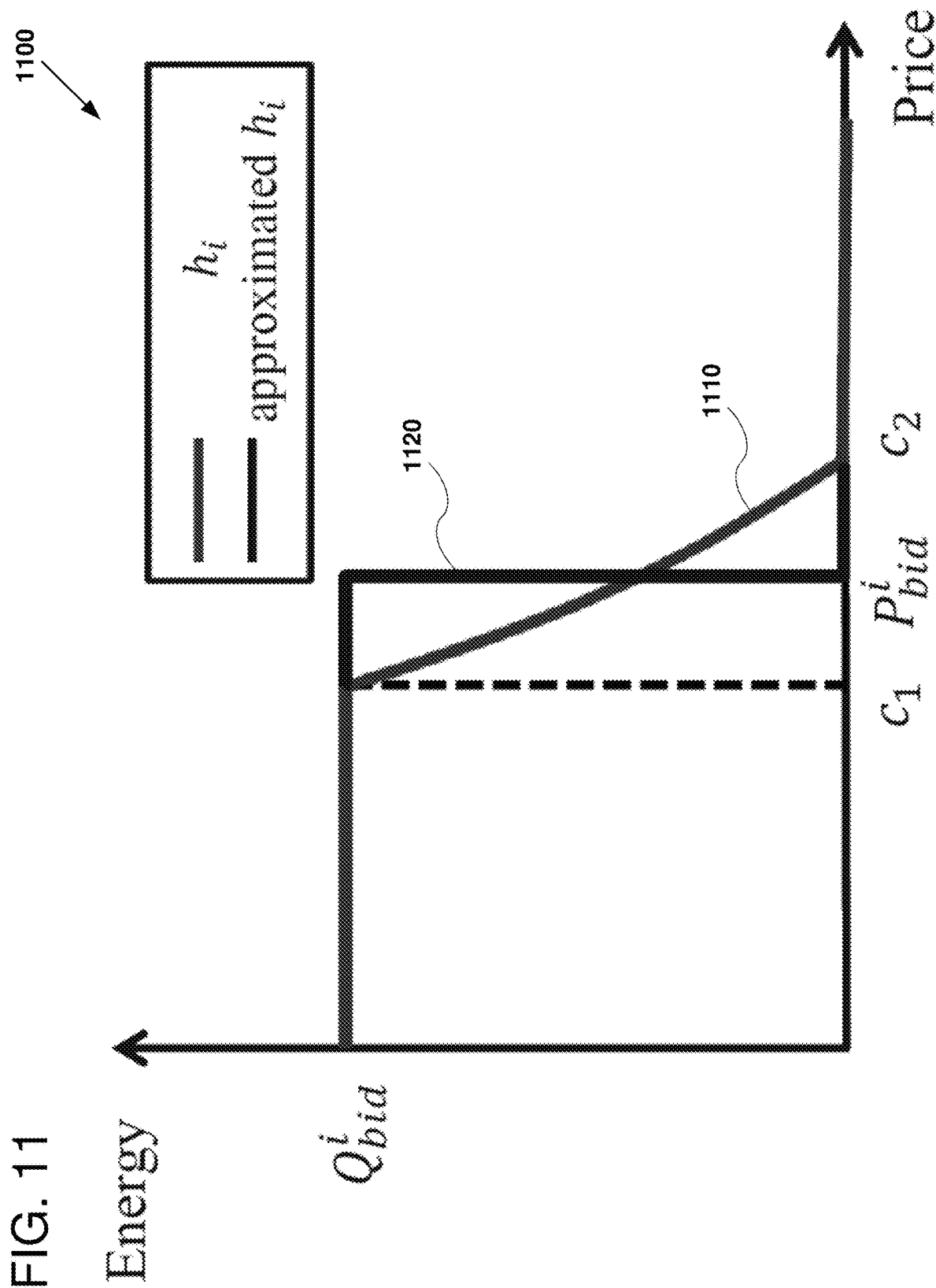
FIG. 11 is a chart illustrating an energy response curve and its approximation using a step function.

FIG. 11 is a chart 1100 depicting an energy response curve 1110 and an approximated energy response curve 1120 that can be used to submit bids to a market coordinator according to the disclosed technology. As shown in the chart 1100, increasing energy consumed is plotted along the y-axis, and increasing bid price is plotted along the x-axis. The energy response curve 1110 corresponds to an energy function $h_i$. As shown, $h_i$ is set at a maximum energy consumption for the associated TCL up to a first price point $c_1$ which the energy consumption bid decreases down to zero energy consumption at point $c_2$.

After a market is cleared (e.g., by the market coordinator 180), the devices receive the energy price $P_c$ and make control decisions $u_i(t_k)$ according to an energy response curve (e.g., the energy response curve 1110 or the approximated energy response curve 1120), which maps the price $P_c$ to the control decisions $u_i(t_k)$. Each device user can specify user preferences $\theta_u^i$ as an input parameter to affect the response curve. Therefore, the response curve can be represented as a function $g: \mathbb{R} \to \mathbb{R}^m$ parameterized by $\theta_i^u$, e.g., $u_i(t_k) = g(P_c; \theta_i^u)$. In some examples of the disclosed technology, the user input $\theta_i^u$ includes the slope of the response curve, the minimum temperature, the maximum temperature, and the desired temperature.

In some examples, the user response curve reflects the trade-off between comfort and cost, for example, when energy price $P_c$ is relatively high, the device will adjust control $u_i(t_k)$ to reduce power consumption. Therefore, the user response can be viewed as being obtained by solving an optimization problem to maximize individual utility of the corresponding load device: user comfort minus energy cost. Such an optimization problem can be formulated by defining a valuation (utility) function $V_i: \mathbb{R} \times \mathbb{R}^n \to \mathbb{R}$, which represents the ith user's valuation (comfort) over $a_i$ units of energy allocation. In some examples, it is assumed that $V_i$ is concave, continuously differentiable, $V_i(0)=0$, and $V'(0)>0$.

If $E_i^m$ is the total energy if the ith device is on during the entire cycle, which indicates $a_i = e_i(x_i(t_k), u_i(t_k)) \leq E_i^m$. Then the user response can be fully captured by the following optimization problem:

$$\max_{a_i} V_i(a_i, x_i(t_k); \theta_i^u) - P a_i \quad (4)$$

subject to:

$$0 \leq a_i \leq E_i^m$$

where P is the energy price variable. An optimal solution to problem (4) can be described by the following Equation 5:

$$h_i(P, x_i(t_k)) = \underset{0 \leq a_i \leq E_i^m}{\operatorname{argmax}} V_i(a_i, x_i(t_k); \theta_i^u) - P a_i \quad (\text{Eq. 5})$$

where $h_i: \mathbb{R} \times \mathbb{R}^n \to \mathbb{R}$. It can be verified that with the conditions imposed on $V_i$, function $h_i$ is continuous and non-increasing with respect to P for $\forall i = 1, \ldots, N$.

It should be noted that in the present example, each user response $g(P; \theta_i^u)$ corresponds to an energy consumption $e_i(x_i(t_k), g(P; \theta_i^u))$, which should be the optimal solution to problem (4). Therefore, the user response g should satisfy the following Equation 6:

$$h_i(\cdot, x_i(t_k)) = e_i(x_i(t_k), g(\cdot; \theta_i^u)) \quad (\text{Eq. 6})$$

Thus, energy response function $h_i$ can be derived when the user response g and the energy function $e_i$ are given.

In some examples, the energy response function $h_i$ is a function based on a hybrid state of the associated TCL and a user response. The hybrid state, in turn, is a function of the operating state of the TCL, room temperature, and inner mass temperature. Thus, by providing such energy response functions, user preferences can be submitted to the market coordinator in the form of a bid that inherently includes information not visible to other bidders. Also shown in the chart 1100 is an approximated energy response function 1120 of the energy function $h_i$. The example approximation shown in FIG. 11 is a step function that intersects the true energy response function at a point half way between points $c_1$ and $c_2$. In other examples, the approximated energy response function 1120 can be represented using different types of approximations (e.g., a piecewise linear model, a parameterized sigmoid function, or other suitable approximation). In some examples, the bid includes the energy response function itself. Design choices as to whether and how to approximate the energy response function can take into account available network resources, capabilities of the market coordinator and other suitable parameters for consideration. Thus, the energy response function $h_i$ can be represented as a single pair $[P_{bid}, Q_{bid}]$.

The proposed framework allows the users to control their loads by specifying the user preferences. Therefore, the user input parameter $\theta_i^u$ is used in the present disclosure to represent this user influence. For notational convenience, the dependence of response curve $g(P; \theta_i^u)$ and the valuation function $V_i(a_i, x_i(t_k); \theta_i^u)$ on $\theta_i^u$, can be omitted and denoted as $g_i(P)$ and $V_i(a_i, x_i(t_k))$, respectively.

D. Example Bidding and Pricing Strategy Using Energy Response

In some examples of the disclosed technology, it can be assumed that both the valuation function $V_i$ and the user response $g_i$ are unknown to the coordinator. Therefore, aside from responding to price signals, the devices are also required to submit bids to reveal some information for the coordinator to determine the energy price. For example, let $b_i: \mathbb{R}^{n+n_q} \times \mathbb{R}^{n_u} \times \mathbb{R}^{n_m} \to \mathbb{R}^{n_b}$ be the bidding function that maps the system state $x_i(t)$, user input $\theta_i^u$ and model parameter $\theta_i^m$ to a bidding vector. In some examples, the bidding vector includes the bidding price $P_{bid}^i$ and the bidding power $Q_{bid}^i$.

In real time, the coordinator collects all the bids from the TCL controllers and determines the price according to those bids. The bids can be denoted as $b(x(tk), \theta^u, \theta^m) = [b_1(x_1(t_k), \theta_1^u \theta_1^m), \ldots, b_N(x_n(t_k), \theta_N^u, \theta_N^m)]^T$. Then a pricing strategy w can be defined to map the bidding collection to the energy price, e.g. w: $\mathcal{B} \to \mathbb{R}$ where $\mathcal{B}$ is the set of all feasible bid collections. In some examples, the price is determined according to the demand curve constructed by bidding collection, an example of which is illustrated in FIGS. 6 and 7, as discussed above.

E. Market-Based Coordination Framework

As discussed above, the market coordinator collects the energy consumer bids and clears the market. In some examples, the market coordinator is configured to clear the bids in a manner intended to maximize overall social welfare of the system of market participants. In order to explain an exemplary formulation of the entire problem below, a step-by-step approach is adopted, starting first with a simple energy allocation problem, and then gradually adding key components until it a number of features of the disclosed technology have been discussed at length.

Consider the following constrained optimization problem, dubbed Problem 1:

Problem 1: Find the optimal energy allocation to maximize social welfare subject to a feeder power constraint:

$$\max_a \sum_{i=1}^N V_i(a_i, x_i(t_k)) - C\left(\sum_{i=1}^N a_i\right) \quad (7)$$

subject to:

$$\begin{cases} \sum_{i=1}^N a_i \leq D \\ \sum_{i=1}^N 0 \leq a_i \leq E_i^m, \end{cases} \quad (8a, 8b)$$

$$\forall i = 1, \ldots, N$$

where D=B*T and B is the feeder capacity and C is the cost function for the coordinator to purchase the energy from the wholesale market.

The foregoing Problem 1 is a convex optimization problem, and gives an optimal energy allocation that maximizes the social welfare. However, one concern is that the energy allocation vector has N degrees of freedom, while the coordinator determines a single-valued clearing price. Therefore, there is no guarantee that the optimal energy allocation can be realized using real-time pricing.

Example 1

As a counterexample, consider two users with $V_1 = a_1$, $V_2 = 3a_2$ and $C(a_1 + a_2) = 2a_1 + 2a_2$. Assume that D=1 and $E_i^m = 2$. An optimal solution to Problem 1 is $a_1 = 0$, $a_2 = 1$. However, according to (Eq. 4), given any energy price, $a_i$ is either 0 or 2. Therefore, the optimal energy allocation cannot be achieved via pricing.

To address this issue, a formal explanation of the concept of implementable energy allocation can be applied as follows:

Definition 1: The energy allocation vector a=[$a_1, \ldots, a_N$] is called implementable if there exists a price P, such that $a_i=h_i(P, x_i(t_k))$ for all i=1, ..., N. In this case, it is said that P implements the energy allocation a in the kth cycle.

With the above definition, the set of the implementable energy allocation can be defined as $I_k=\{a|\exists P, s.t. a_i=h_i(P, x_i(tk)), \forall_i=1, \ldots, N\}$. An energy allocation problem considering implementable allocation and feeder power constraint is discussed below regarding Problem 2:

Problem 2: Find an optimal implementable energy allocation to maximize social welfare subject to a feeder power constraint:

$$\max_{a \in \chi_k} \sum_{i=1}^{N} V_i(a_i, x_i(t_k)) - C\left(\sum_{i=1}^{N} a_i\right) \quad (9)$$

subject to:

$$\begin{cases} \sum_{i=1}^{N} a_i \leq D \\ 0 \leq a_i \leq E_i^m, \end{cases}$$

$$\forall i = 1, \ldots, N$$

Compared with Problem 1, Problem 2 has an additional constraint $a \in I_k$, which ensures that an optimal solution is implementable. But in most cases, these two problems are not equivalent. To this end, the following analysis is formulated where the valuation functions $V_i$ and individual load dynamics are unknown to the coordinator:

Problem 3: The coordinator should design the bidding function $b_i$, and determine the pricing strategy w such that $w(b(x(t_k), \theta^u, \theta^m))$ implements an optimal solution to Problem 2.

Thus, certain examples of the disclosed framework are different from wholesale energy market bidding, as the internal dynamics of the TCLs are incorporated into the decision making. The energy price triggers the setpoint control, which modifies the system dynamics and affects the resulting power consumption.

In some examples of the disclosed technology, the coordinator prices the energy and hence influences the user control. The user control parameters are propagated through load dynamics and affects the system state, which determines TCL controller bidding. Then these bids are submitted to the coordinator and in return will affect the energy price of the next cycle. Therefore, different from classical mechanism design problems and the wholesale energy market, the proposed framework considers the load dynamics and forms a closed-loop system, creating a decentralized approach for the energy consumers and the coordinator to determine an optimal energy allocation cooperatively in real time.

IX. Example Pricing and Bidding Strategies

In this section, an optimal pricing strategy and a corresponding bidding strategy in two steps are disclosed. First, for purposes of this example it is assumed that the coordinator has the complete information and derives an analytic expression of the optimal price. Second, for purposes of this example the complete information assumption is removed, and a bidding strategy is proposed to implement the optimal pricing strategy in a decentralized manner.

As discussed in further detail above regarding FIG. 8, at the end of the market clearing cycle, each controller device will measure the room temperature and submit the bids for the next cycle, and repeats this bidding-clearing-response process. An example pricing and bidding strategy is discussed below.

A. Pricing Strategy Assuming Complete Information

Throughout this subsection, the function $V_i$ and $h_i$'s dependence on the system state $x_i(t_k)$ are omitted, as doing so does not substantially affect the result for this example. In all other sections this dependence is considered unless otherwise stated.

To derive the optimal price to Problem 3, first define a price P*, which is the price that implements the optimal solution of the following energy allocation problem as stated in Equation 10:

$$\max_{a} \sum_{i=1}^{N} V_i(a_i, x_i(t_k)) - C\left(\sum_{i=1}^{N} a_i\right) \quad (10)$$

subject to:

$$0 \leq a_i \leq E_i^m, \forall i = 1, \ldots, N$$

Notice that the energy allocation problem is reduced from Problem 1 by dropping the feeder power constraint. According to the welfare theorem, the optimal price that implements the optimal energy allocation should be the marginal cost of energy. This result can be summarized as the following proposition:

Proposition 1: Let a* be the optimal solution of problem, then $a^* \in I_k$, and $P^*=C'(\Sigma_{i=1}^{N} a_i^*)$ implement a*.

Remark 3: The proof of Proposition 1 implies that the optimal energy allocation strategy to Equation 10 is always implementable. However, this property does not hold when the coupled constraint (Relation 8a) is taken into consideration.

To find an optimal solution of Problem 2, the constraint $a \in I_k$ is imposed on Problem 1 and its cost function is checked. As $a \in I_k$, there is a P such that $h_i(P)=a_i$ for $\forall i$. Inserting this function into the social welfare function above (Relation 10), we obtain the following:

$$U(P) = \sum_{i=1}^{N} V_i(h_i(P)) - C\left(\sum_{i=1}^{N} h_i(P)\right) \quad (Eq. 11)$$

Proposition 2: U(P) is non-increasing with respect to P when P≥P*.

Proof: Since Since U(P) is continuous, we only need to prove that $U^0(P^+) \leq 0, \forall P \geq P^*$, where $U^0(P^+)$ denotes the right derivative of function U at P. As $U^0(P^+) = \Sigma_{i=1}^{N}\{(V'_i(h_i(P^+)) - C'(\Sigma_{i=1}^{N} h_i(P_N))) \cdot h'_i(P^+)\}$, it suffices to show that $(V_i^0(h_i(P)) - C^0(P_{i=1} h_i(P))) \cdot h^0_i(P^+) \leq 0$ for all i. For notation convenience, let $\gamma_i(P)=V_i^0(h_i(P))-C'(\Sigma_{i=1}^{N} h_i(P))$, we need to prove $\gamma_i(P)^* h'_i(P^+) \leq 0$ for $\forall i$ when P≥P*. Now we divide all the users into two groups. The user in the first group satisfies $\gamma_i(P^*) \geq 0$. As $V_i$ is concave, C is convex, and $h_i$ is non-increasing, $\gamma_i(P)$ is non-decreasing. Therefore, $\gamma_i(P) \geq \gamma_i(P^*) \geq 0$, which indicates that $\gamma_i(P) \cdot h^0_i(P^+) \leq 0$. For the second group, we have $\gamma_i(P^*) < 0$. Note that $\gamma_i(P^*)$ is the derivative of (4) with respect to $a_i$ evaluated at the optimal point $h_i(P^*)$ when P=P*. As (4) is concave and differentiable, $\gamma_i(P^*)<0$ indicates that the optimal solution of (4) is on the boundary of the constraint: $h_i(P^*)=0$. Moreover, since $h_i(P^*) \geq 0$ and $h_i$ is non-increasing, when $P>P^*$, $h_i(P)=0$, which indicates that $h^0{}_i(P^+)=0$ for $P>P^*$. In addition, $P^*<P^-$. Therefore, $\gamma_i(P) \cdot h^0{}_i(P^+)=0$ for i in the second group. This completes the proof.

Furthermore, define a $\bar{P}$ such that $\Sigma_{i=1}^N h_i(\bar{P})=D$. The existence and uniqueness of $\bar{P}$ is guaranteed as long as the function $h_i$ is non-increasing. This produces the following result:

Theorem 1: Let $P_c$ be the price that implements the optimal solution of Problem 2, then $P_c = \max\{\bar{P}, P^*\}$.

Proof: First, consider the case where $P^* \geq \bar{P}$. As $h_i(P)$ is non-increasing with respect to P, it is clear that $P^* \geq \bar{P}$ indicates $\Sigma_{i=1}^N h_i(P^*) \leq D$. In addition, according to Proposition 1, $P^*$ implements an $a^*$ such that $a^* \in I_k$. With above conditions satisfied, Problem 1 and Problem 2 are equivalent, which indicates $P_c = P^*$. Second, let us consider the case where $P^* < \bar{P}$. As $h_i(P)$ is non-increasing, the feeder capacity constraint is satisfied if and only if $P \geq \bar{P}$. Moreover, Proposition 2 guarantees that the utility function of Problem 2 is non-increasing with respect to P when $P \geq P^*$. Therefore, $P_c = \bar{P}$. This completes the proof.

To this end, Theorem 1 does not provide an explicit solution of the optimal price that can be derived numerically. But it provides a procedure to determine $P_c$: first solve Problem 10 and compute $P^*$. Then $P^*$ is compared with $\bar{P}$. Thus, Theorem 1 indicates that the optimal price can be determined by a comparison between $P^*$ and $P^-$. However, the computation of this optimal price requires global information, which is often not available to the coordinator. Therefore, a bidding strategy is presented in the next subsection to collect device information and compute an optimal price.

B. Bidding Strategy Design

This section outlines a general bidding strategy for the coordination of TCLs, as can be used in certain examples of the disclosed technology. A disclosure of application of the example bidding strategy to TCLs (e.g., air conditioning systems) is then further detailed.

An example general bidding design is disclosed. Ideally, each device can submit all the private information to the coordinator, including valuation function $V_i$ system state $x_i(t_k)$, model parameter $\theta_m^i$ and the user input $\theta_u^i$. Then the coordinator can easily solve Problem 3 and derive the optimal price. However, this bidding strategy is difficult to implement in the real time market, due to computational and communicational limitations. Therefore, the device has to submit a bid of a minimum amount of information that is enough for the market to derive an optimal clearing price. For this example application, a sufficient bidding is defined as follows:

Definition 2: A bidding vector $b(x(t_k), \theta_u, \theta^m)$ is a sufficient bidding, if the coordinator can compute the optimal price $P_c$ numerically merely based on $b(x(t_k), \theta^u, \theta_m)$.

As will be readily understood to one of ordinary skill in the relevant art, if the users bid all the private information, then there is a sufficient bidding. To derive a realistic sufficient bidding, we refer to (Eq. 6), and assume that the energy function $e_i(x_i(t_k), g_i(\cdot))$ can be parameterized by $\theta_i^b$, because the structure of the energy function for each ith TCL is the same, while their differences can be captured by $\theta_i^b$. This assumption is justified because the TCLs can be captured by the same ETP model and regulated by the same hysteretic controller (Eq. 3). Therefore, the energy function can be defined as:

$$h_i(\cdot, x_i(t_k)) = e_i(x_i(t_k), g_i(\cdot))$$
$$\triangleq \tilde{e}(\cdot; \theta_i^b)$$

where $\tilde{e}$ is the energy versus price function parameterized by $\theta_i^b$. This provides the following result:

Theorem 2: Regard $e_i(x_i(t_k), g_i(P))$ as a function of price P and assume this function can be parameterized by $\theta_i^b$, because $e_i(x_i(t_k), g_i(P)) = \tilde{e}(P; \theta_i^b)$. Then $[\theta_i^b, \ldots, \theta_n^b]$ is a sufficient bidding.

Proof: According to Theorem 1, $P_v = \max\{\bar{P}, P^*\}$, where $\Sigma_{i=1}^N h_i(\bar{P}, x_i^k) = D$ and $$P^* = C'\left(\sum_{k,i=1}^N (a_i^*)\right).$$

As $P^*$ implements $a^*$, we have $A^*{}_i = h_i(P^*, x_i)$ for $i=1, \ldots, N$ and hence the following:

$$\begin{cases} \sum_{i=1}^N h_i(\bar{P}, x_i^k) = D \\ P^* = C'\left(\sum_{i=1}^N (h_i(P^*, x_i^k))\right) \end{cases} \quad \text{(Eq. 12)}$$

Based on (Eq. 12), the coordinator only needs to know the function $h(\cdot) \triangleq \Sigma_{i=1}^N h_i(\cdot, x_i(t_k))$ to compute the optimal price numerically. As $e_i(x_i(t_k), g_i(\cdot))$ can be parameterized by $\theta_i^b$, according to (6), $\theta_i^b$ contains all the information of function $h_i(\cdot, x_i(t_k))$. Therefore, $[\theta_i^b, \ldots, \theta_N^b]^T$ is a sufficient bidding.

As will be readily understood to one of ordinary skill in the relevant art, the result of Theorem 2 is very general and can be applied in different types of TCLs, including HVACs, water heaters, dyers, etc. It can also be extended to the coordination of users with heterogeneous energy response curves where each user has to bid both the function structure and the parameters of $e_i$.

In some examples of the disclosed technology, a market coordinator orders all the bids in decreasing order and clears the market based on the demand curve constructed in FIG. 5. This indicates the coordinator expects that for each user, if the market price is higher than his bidding price, his bid is not cleared and he will consume no energy during the next market clearing cycle; if the market price is lower than the bidding, then he wins the bid and consumes $Q_{bid}^i * T$ amount of energy, where T is the length of the market clearing cycle. In other words, a step function is used to approximate the curve $h_i$, (as shown in FIG. 11).

A further explanation of an exemplary method of calculated the energy response function $h_i$, for example, as depicted in FIG. 11, follows here. $P_{btd}^i$ denotes the bidding price, and $c_1$ and $c_2$ are computed based on $x_i(t_k)$, $\theta_i^u$ and $\theta_i^m$.

For notational convenience, define $c_1 = e_i(u_1, \theta_i^u, \theta_i^m)$ and $c_2 = e_i(u_2, \theta_i^u, \theta_i^m)$, where $u_1$ and $u_2$ are the temperature setpoint control corresponding to $c_1$ and $c_2$, respectively. Using the second-order ETP model (2) and control policy (3), $u_1$ and $u_2$ for the ith device can be obtained as:

$$\begin{cases} u_1 = T_c^i(t_k) + \delta/2 \\ u_2 = LA_i^{-1} e^{A_i T}(A_i z_i(t_k) + B_{on}^i) - LA_i^{-1} B_{on}^i + \delta/2 \end{cases} \quad (13)$$

where $L=[1,0]$, and the power state of the ith TCL is on at $t_k$.

The positions of $c_1$ and $c_2$ contribute significantly to effectiveness of the bidding. In some examples, the bid price is determined at the middle point of $c_1$ and $c_2$, which gives:

$$P_{bid}^i = \frac{c_1 + c_2}{2} \qquad \text{(Eq. 14)}$$

In this example, the sufficient bidding consists of the bidding price and bidding power, e.g., $\theta_i^b = [P_{bid}^i, Q_{bid}^i]$. After the coordinator collects all the bids, the function $h_i$ can be constructed to compute the energy price.

The disclosed bidding strategy assumes knowledge of ETP model parameters $\theta_i^m$. In practice it may be difficult to derive these parameters. In some examples of the disclosed technology, ETP model parameters can be estimated by joint state and parameter estimation using extended Kalman filter or particle filter. In some examples, the ETP model used in the framework may be inaccurate in terms of characterizing the energy consumption of TCLs.

X. Example Simulation Results

In this section example simulations based on the proposed framework are applied to the market-based coordination of the thermostatically controlled loads. Example simulation results are presented to demonstrate effectiveness of the proposed approach in certain examples of the disclosed technology.

A. Simulation Setup

The proposed framework is validated against simulations in GridLAB-D, where a second-order ETP model is used to simulate air conditioners as TCLs. The ETP model parameters are determined by various building parameters, such as floor area, ceiling height, glass type, glazing layers and material, area per floor, etc. Realistic default values are used in GridLAB-D. In the simulation, 1000 sets of building parameters are generated. A few parameters are randomly generated and the rest of the parameters take their default values in GridLAB-D. Throughout the simulation, it is assumed that the air conditioner consumes 5 kW power on average. The uncontrollable aggregated power is assumed to be 12 MW, and the feeder power constraint is 15 MW.

The simulation is further based on weather data and the Typical Meteorological Year (TMY) data for Columbus, Ohio, include air temperature and the solar gain. The energy price data is derived from a wholesale energy market and modified to a retail rate in expressed in dollars per kWh, plus a retail modifier.

Figure 12:
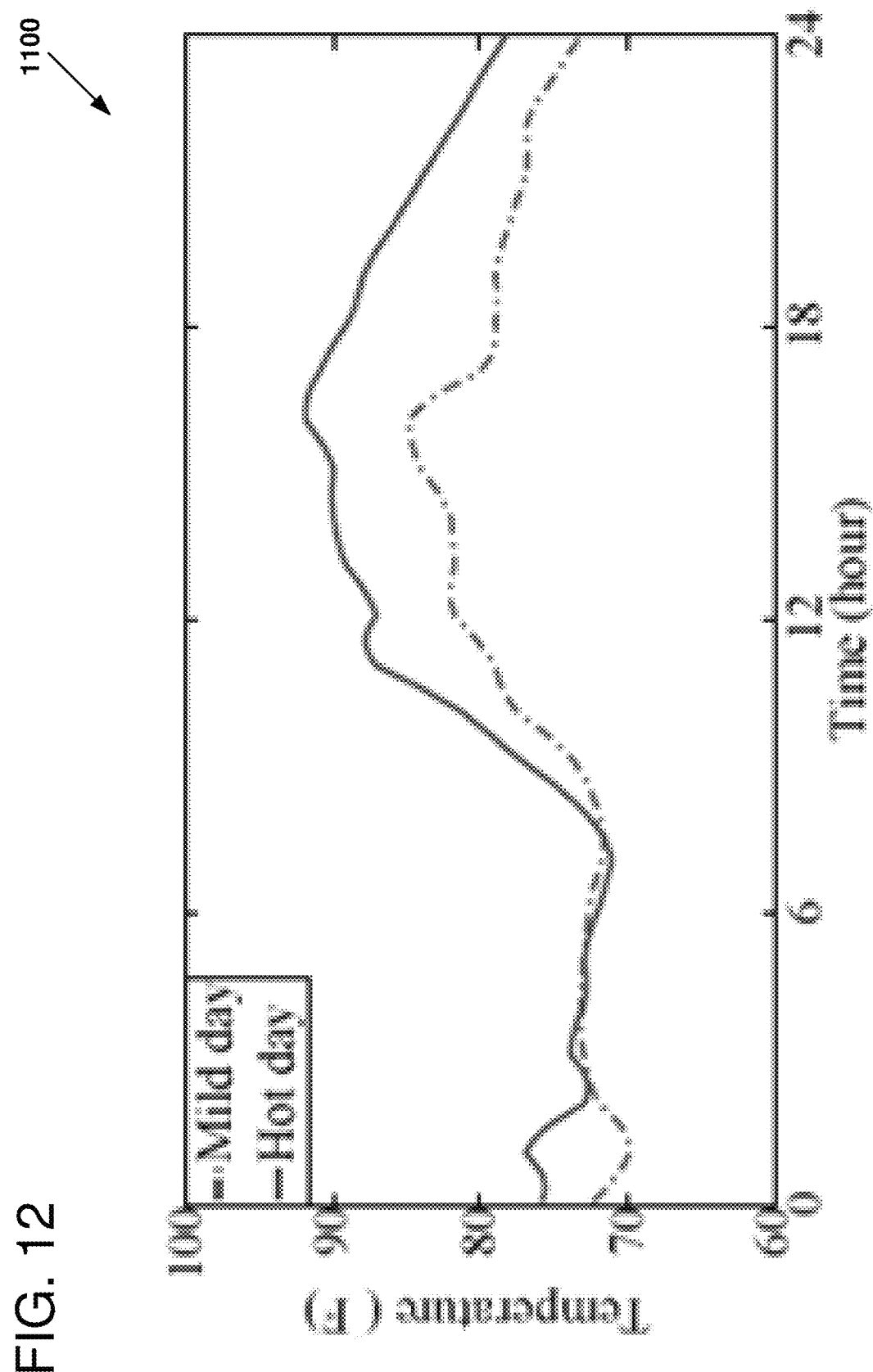
FIG. 12 is a chart illustrating hourly temperatures used in a simulation, according to an example of the disclosed technology.

Different outside air temperature traces are used to validate the proposed framework, as shown in the chart 1200 of FIG. 12. The illustrated record is from Aug. 16 (hot day) and Aug. 20 (mild day), 2009 in Columbus, Ohio.

Figure 13:
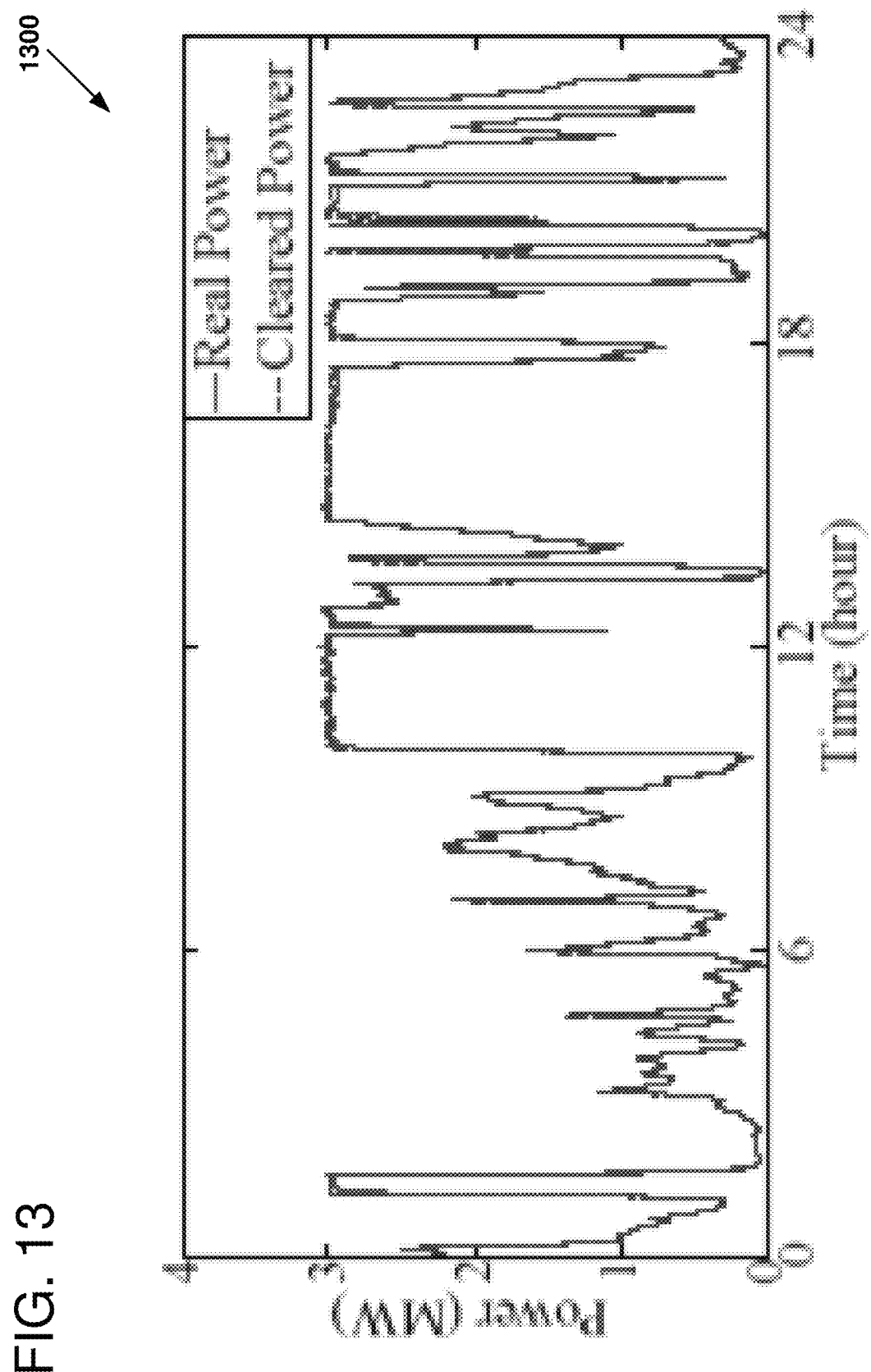
FIG. 13 is a chart illustrating a power trajectory and cleared power based on a demand curve, according to an example of the disclosed technology.

First, the simulation is performed with the outside air temperature record on Aug. 20, 2009 in Columbus, Ohio. The simulation covers a horizon of 24 hours, and the power trajectory is shown in the chart 1300 of FIG. 13 (average power during each market clearing cycle). When a market clearing price is given, an associated cleared power can be found on the demand curve (e.g., as described above regarding FIGS. 5 and 6). This cleared power bid is the coordinator's estimation on the aggregated power based on the received consumer bids. Simulation results show that the cleared power accurately captures the real power trajectories, which implies that the proposed bidding strategy enables the coordinator to effectively construct the demand curve and make substantially optimal pricing decisions.

Figure 14:
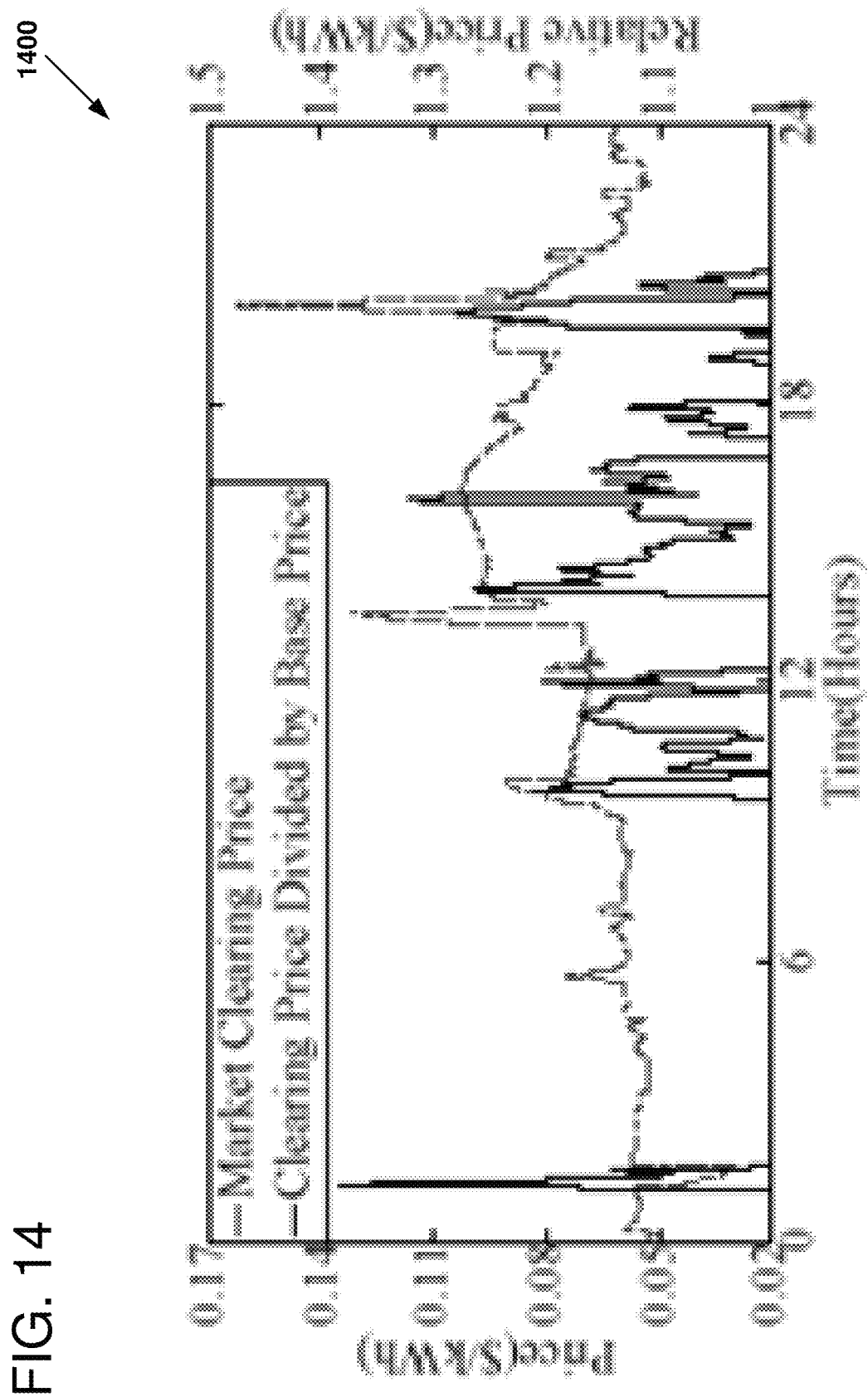
FIG. 14 is a chart illustrating trajectories of market clearing prices and a clearing price divided by based price, according to an example of the disclosed technology.
Figure 15:
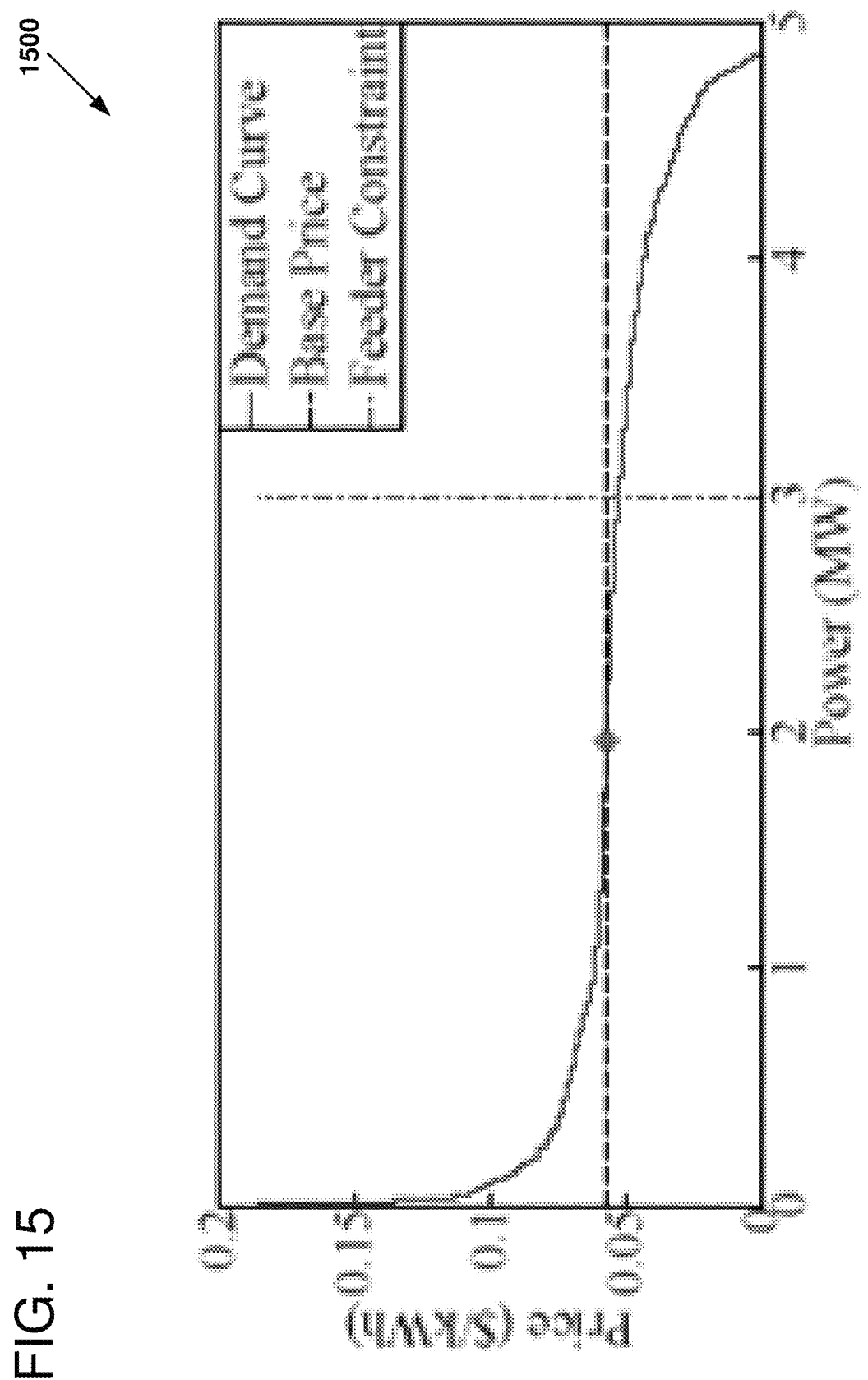
FIG. 15 is a chart illustrating a demand curve and market clearing, according to an example of the disclosed technology.
Figure 16:
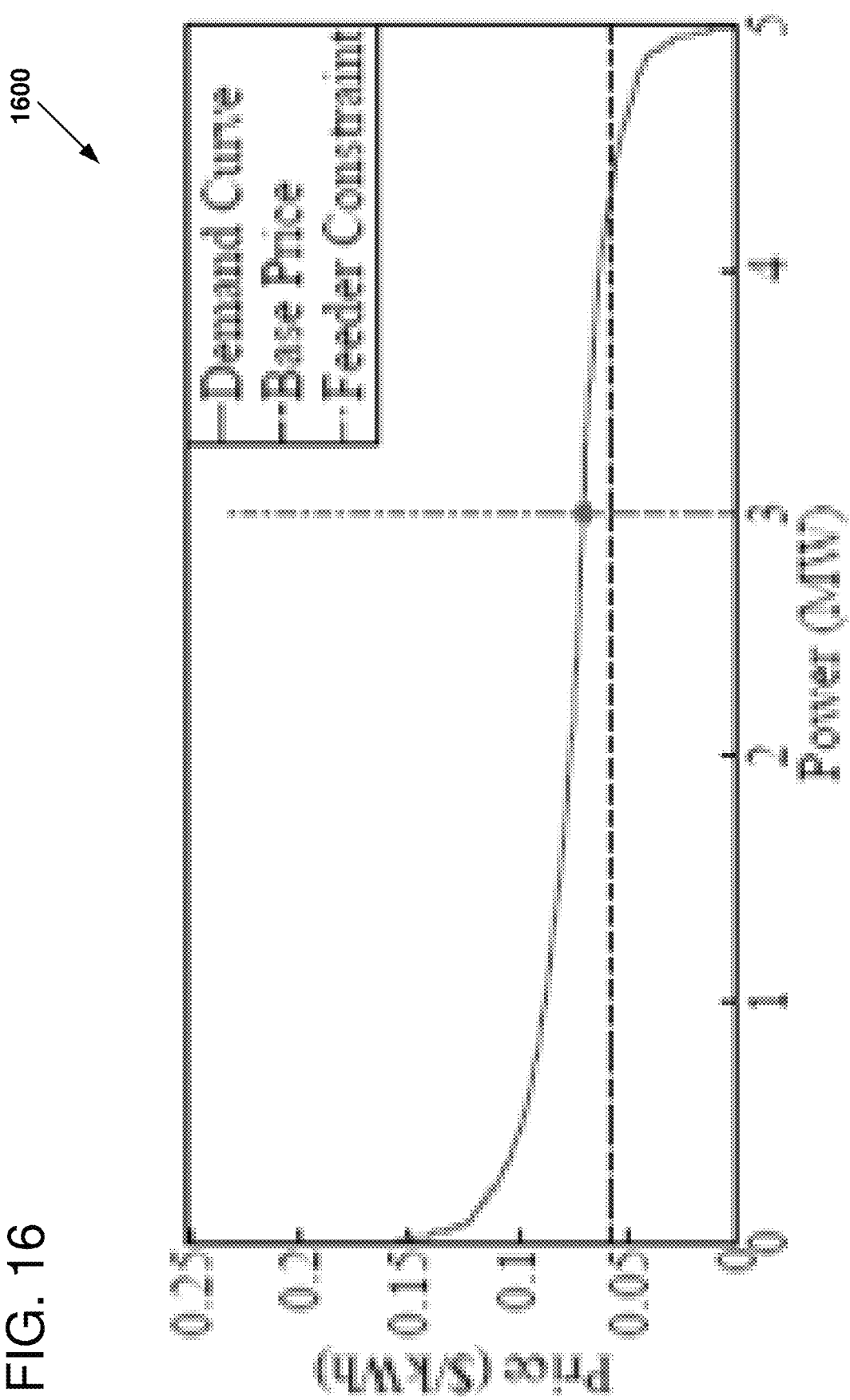
FIG. 16 is a chart illustrating a demand curve and market clearing, according to an example of the disclosed technology.
Figure 17:
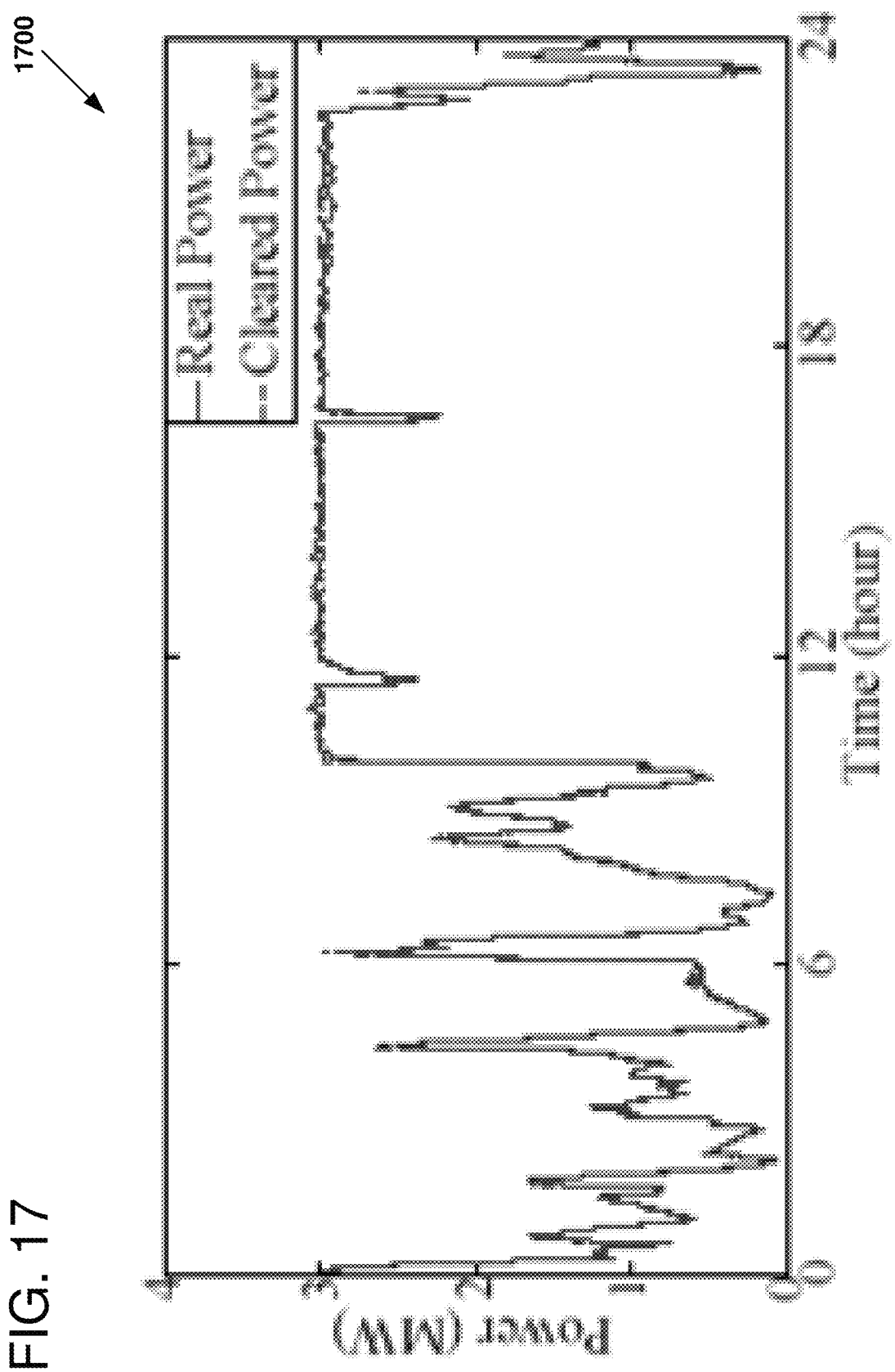
FIG. 17 is a chart illustrating a power trajectory and cleared power based on a demand curve, according to an example of the disclosed technology.

The market clearing prices for the entire day is presented in the chart 1400 of FIG. 14. The average energy price during the entire day is 0.072$/kWh. It can be observed that the energy prices are higher than the base price during congestion, which effectively caps the aggregated power at key times. The demand curve and the market clearing process are shown in the chart 1500 of FIG. 15 and the chart 1600 of FIG. 16, which correspond to the 8.33th hour and the 12.5th hour, respectively. When the total power demand is less than the feeder power constraint, the clearing price is set equal to the base price (FIG. 9), otherwise the clearing price is determined by the intersection of the demand curve and the power constraint curve, as shown in FIG. 10. Next, the energy price and the temperature record on Aug. 16, 2009 in Columbus, Ohio are applied. The power trajectory for this case is illustrated in FIG. 17. As shown in FIG. 17, the cleared power can accurately capture the real aggregated power, and the power can be effectively capped under the feeder power constraint. As the outside air temperature on August 16 is higher than that of August 20, more power congestion can be observed for this case.

Figure 18:
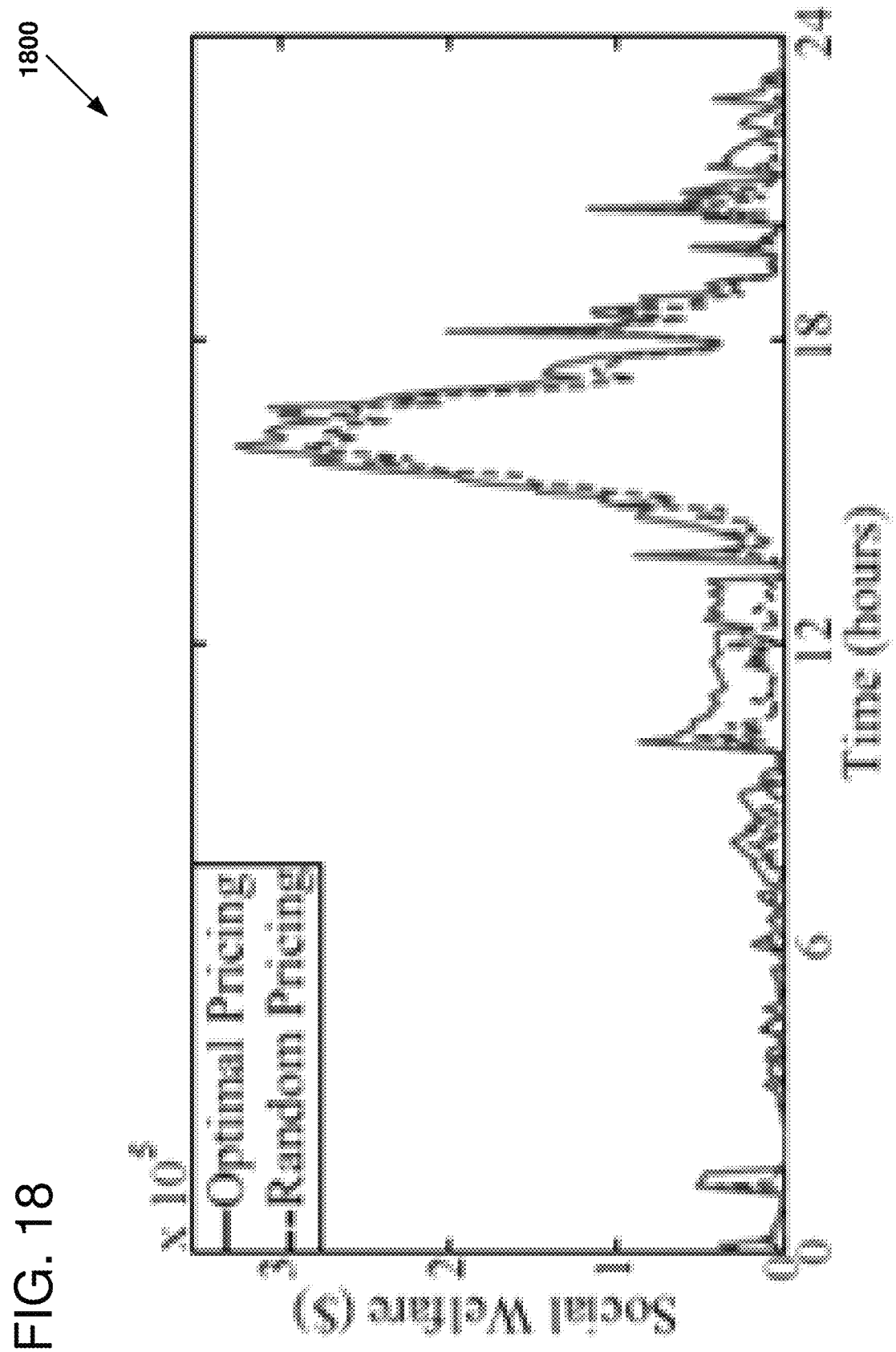
FIG. 18 is a chart illustrating social welfare of an optimal pricing and a random pricing, according to an example of the disclosed technology.

Furthermore, to demonstrate the optimality of the proposed pricing strategy, it can be compared with a base scenario in terms of social welfare. In the base scenario, the market clearing price is randomly chosen in a set $\Gamma$, which satisfies the following condition: (a) $P \in \Gamma$ indicates that $P_c$ implements an aggregated power that respects the feeder power constraint ($P \geq \bar{P}$); (b) for any $P \in \Gamma$, P should be less than the maximum price of our proposed approach. This market clearing strategy is dubbed the random pricing strategy. The social welfare of the two pricing strategies is shown in FIG. 18. The simulation results demonstrate that the optimal pricing strategy improves the social welfare of the random pricing by 46.8% on average, and proposed optimal pricing strategy outperforms the random pricing in terms of social welfare.

Thus, a market-based coordination framework for thermostatically controlled loads is disclosed, where a coordinator uses pricing incentives to manage a group of users under a given feeder power constraint. An example optimal pricing strategy is derived, and the bidding strategy is c designed to elicit an optimal price numerically. The proposed framework can provide a systematic way to designing bidding and pricing strategy for the price-driven demand response programs. Simulation results are presented to validate the proposed approach. In other examples, the fully dynamic market based control framework is used with multiple bidding periods and extending to other appliances, including HVACs, water heaters, dryers, and other suitable loads.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims.

We claim:

1. A method of providing power to a load via a power grid by submitting bids to a coordinator, the method comprising:
with a controller:
determining an energy function characterized by a parameter vector, the energy function relating price data for one or more energy prices to quantity data for power to be consumed by the load, the load being coupled to receive power from the power grid; and
sending the parameter vector as a bid for power for a finite time period to the coordinator, wherein the bid further includes a structure of the energy function;

responsive to the sending of the parameter vector, receiving a clearing price from the coordinator; and
responsive to the receiving of the clearing price, sending a signal to cause actuation of the load during the finite time period,
wherein the energy function is an approximation of a true energy function, the approximated energy function determined as a step function that intersects the true energy function at a point half way between a first price point representing a maximum of the true energy function and a second price point at which the true energy function is equal to zero.

2. The method of claim 1, wherein the clearing price is based at least in part on the bid, on bids received by the coordinator from a plurality of additional loads, and on a feeder power constraint.

3. The method of claim 1, wherein the energy function is based at least in part on one or more of the following: a consumption state of the load, an air temperature, or an inner mass temperature.

4. The method of claim 1, wherein the energy function is based at least in part on a user response parameter, the user response parameter relating energy price and a selected user comfort level.

5. The method of claim 1, wherein the energy function is based at least in part on an equivalent thermal parameter model and a control policy indicating one or more power states for the load.

6. The method of claim 1, wherein the energy function is based at least in part on an equivalent thermal parameter model.

7. The method of claim 1, wherein the finite time period is less than one hour.

8. The method of claim 1, wherein the controller further comprises:
one or more sensors configured to generate temperature data used to determine the energy function;
a network adapter configured to transmit the bid to the coordinator;
one or more processors; and
one or more actuators configured to activate and/or deactivate the load responsive to one or more signals received from the processors.

9. The method of claim 1, wherein the load is one of a plurality of homogeneous loads receiving power from the power grid.

10. One or more computer-readable storage media storing computer-executable instructions that when executed by a computer, cause the computer to perform a method, the computer-executable instructions comprising:
instructions that cause the computer to determine an energy function, wherein the energy function relates price data for one or more energy prices to quantity data for power to be consumed by a load coupled to receive power from a power grid, and wherein the energy function is an approximation of a true energy function, the approximation determined as a step function that intersects the true energy function at a point half way between a first price point representing a maximum of the true energy function and a second price point at which the true energy function is equal to zero;
instructions that cause the computer to parameterize the energy function as a vector;
instructions that cause the computer to transmit the vector parameterizing the energy function as a bid for power for a finite time period to a coordinator;
instructions that cause the computer to receive clearing price data from the coordinator responsive to the transmitting of the vector parameterizing the energy function; and
instructions that cause the computer to send a signal that causes actuation of the load, the signal being based on the clearing price data.

11. The one or more computer-readable storage media of claim 10, further comprising:
instructions that cause the computer to receive a clearing price from the coordinator responsive to transmitting the bid, the clearing price being based at least in part on the bid and on bids received from a plurality of additional loads.

12. The one or more computer-readable storage media of claim 10, wherein the energy function based at least in part on one or more of the following: a consumption state of the load, an air temperature, or an inner mass temperature.

13. The one or more computer-readable storage media of claim 10, wherein the energy function is based at least in part on a user response parameter, the user response parameter relating energy price and a selected user comfort level.

14. The one or more computer-readable storage media of claim 10, wherein the energy function is based at least in part on an equivalent thermal parameter model and a control policy indicating one or more power states for the load.

15. A market-based control system configured to coordinate a group of thermostatically controlled loads to achieve system-level objectives with pricing incentives, the system comprising:
a market coordinator configured to generate clearing price data based on a plurality of bids;
a plurality of homogeneous thermostatically controlled loads (TCLs), each of the TCLs being configured to determine an energy function characterized by a parameter vector and transmit the parameter vector to the market coordinator as a bid for power received via a power grid for a predetermined time period, the energy function for each TCL relating price data for one or more energy prices to quantity data for power to be consumed by the TCL, and each of the TCLs being further configured to consume or not consume power from the power grid based at least in part on the clearing price data and the TCL's respective bid for the predetermined time period; and
a computer network configured to transmit the bids and the clearing price data between the market coordinator and each of the TCLs,
wherein the energy functions for the plurality of TCLs have the same structure, and wherein differences between the energy functions for the plurality of TCLs are captured by the parameter vectors.

16. The system of claim 15, further comprising the power grid, the power grid being configured to distribute power to the TCLs based at least in part on a market cleared by the market coordinator.

17. The system of claim 15, further comprising a power generation market administrator configured to send wholesale energy price data to the market coordinator, the wholesale energy price data being used at least in part to determine the clearing price data.

18. The system of claim 15, wherein the market coordinator is further configured to produce a demand curve by ordering the bids in a decreasing sequence from the highest bid to the lowest bid.

19. The system of claim 15, wherein the bid for at least one of the TCLs does not include the structure of the energy function.

* * * * *